United States Patent
Ikeda et al.

(10) Patent No.: US 10,198,096 B2
(45) Date of Patent: Feb. 5, 2019

(54) INFORMATION PROCESSING APPARATUS, DISPLAY CONTROL METHOD, AND PROGRAM

(75) Inventors: Tetsuo Ikeda, Tokyo (JP); Ryu Aoyama, Kanagawa (JP); Takehiko Tsurumi, Tokyo (JP); Shoichiro Moriya, Tokyo (JP); Fuminori Homma, Tokyo (JP)

(73) Assignee: SONY CORPORATION, Tokyo (JP)

( * ) Notice: Subject to any disclaimer, the term of this patent is extended or adjusted under 35 U.S.C. 154(b) by 668 days.

(21) Appl. No.: 12/709,740

(22) Filed: Feb. 22, 2010

(65) Prior Publication Data
US 2010/0214249 A1   Aug. 26, 2010

(30) Foreign Application Priority Data
Feb. 20, 2009 (JP) ............... P2009-038234

(51) Int. Cl.
G06F 3/041 (2006.01)
G06F 3/044 (2006.01)
G06F 3/0488 (2013.01)

(52) U.S. Cl.
CPC .......... G06F 3/041 (2013.01); G06F 3/04883 (2013.01)

(58) Field of Classification Search
CPC ................. G06F 3/044; G06F 2203/04808
USPC ........................................ 345/173
See application file for complete search history.

(56) References Cited

U.S. PATENT DOCUMENTS

| | | | | |
|---|---|---|---|---|
| 5,406,307 A | * | 4/1995 | Hirayama et al. | 715/800 |
| 5,880,411 A | * | 3/1999 | Gillespie et al. | 178/18.01 |
| 2005/0093868 A1 | * | 5/2005 | Hinckley | G06F 3/011 345/502 |
| 2005/0114778 A1 | * | 5/2005 | Branson et al. | 715/711 |
| 2005/0289476 A1 | * | 12/2005 | Tokkonen | G06F 3/038 715/769 |
| 2006/0197750 A1 | * | 9/2006 | Kerr et al. | 345/173 |
| 2006/0238517 A1 | * | 10/2006 | King et al. | 345/173 |
| 2007/0061745 A1 | * | 3/2007 | Anthony et al. | 715/764 |
| 2008/0034306 A1 | * | 2/2008 | Ording | 715/764 |

(Continued)

FOREIGN PATENT DOCUMENTS

| | | |
|---|---|---|
| JP | 3143462 | 12/2000 |
| JP | 2002-157086 | 5/2002 |

(Continued)

OTHER PUBLICATIONS

European Search Report dated Feb. 18, 2011, in Munich in corresponding EP 10 25 0234.

*Primary Examiner* — Ibrahim A Khan
(74) *Attorney, Agent, or Firm* — Paratus Law Group, PLLC

(57) ABSTRACT

There is provided an information processing apparatus includes an outer frame portion which forms an outer frame of a display portion where an object is displayed; a position detecting portion which detects a position of an operating body coming in touch with or close to the display portion or the outer frame portion; and a display controlling portion which displays on the display portion, auxiliary information about an object situated at a position of the operating body detected by the position detecting portion at a start of the shift when the operating body shifts to the outer frame portion while keeping touch with or close to the display portion.

14 Claims, 15 Drawing Sheets

(56) References Cited

U.S. PATENT DOCUMENTS

| | | | |
|---|---|---|---|
| 2008/0109722 A1* | 5/2008 | Gengler et al. | 715/708 |
| 2008/0165150 A1* | 7/2008 | Kwon | 345/173 |
| 2008/0284754 A1* | 11/2008 | Kao et al. | 345/176 |
| 2009/0109187 A1* | 4/2009 | Noma | G06F 3/04883 345/173 |
| 2009/0174679 A1* | 7/2009 | Westerman | G06F 3/03547 345/173 |
| 2009/0313545 A1* | 12/2009 | Kim et al. | 715/720 |
| 2010/0164959 A1* | 7/2010 | Brown | G06F 3/04886 345/473 |
| 2011/0205163 A1* | 8/2011 | Hinckley et al. | 345/173 |

FOREIGN PATENT DOCUMENTS

| | | |
|---|---|---|
| JP | 2003-296015 | 10/2003 |
| JP | 2004-178512 | 6/2004 |
| JP | 2005-004690 | 1/2005 |
| JP | 2007-164695 | 6/2007 |
| JP | 4161814 | 8/2008 |
| JP | 2008-217640 | 9/2008 |
| JP | 2008-299771 | 12/2008 |
| WO | WO 2007/103631 A2 | 9/2007 |

\* cited by examiner (SELECTING OPERATION)

FIG.6
(SWITCH TO HIGH SPEED SCROLL MODE)
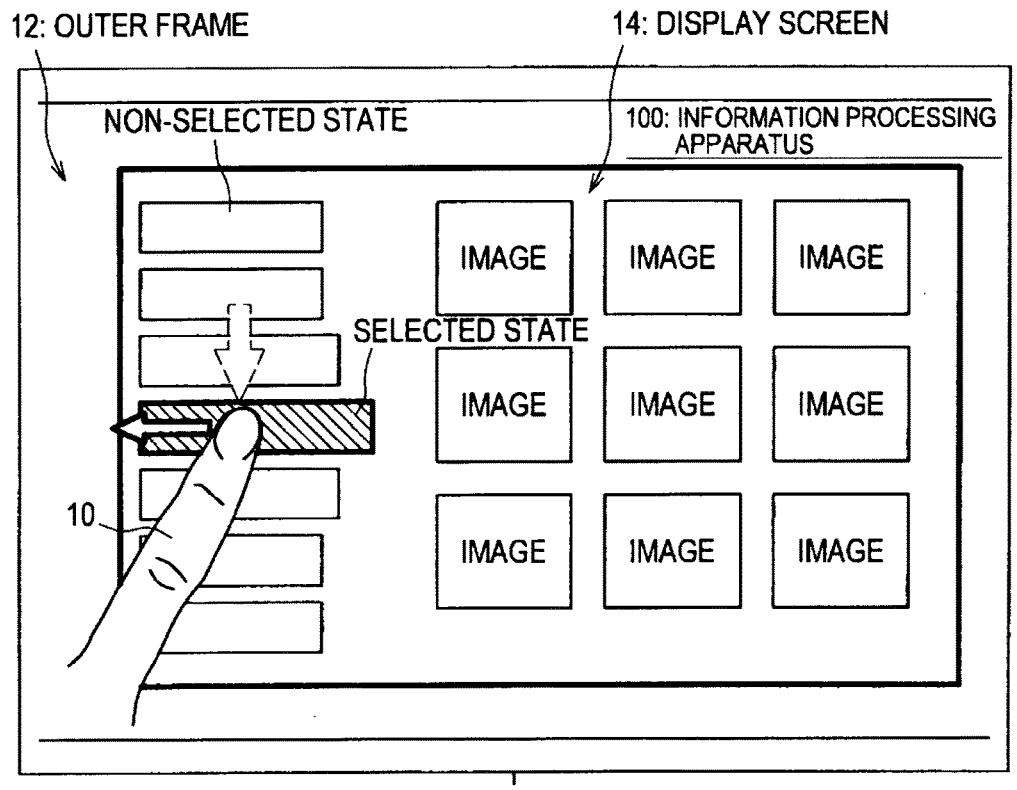
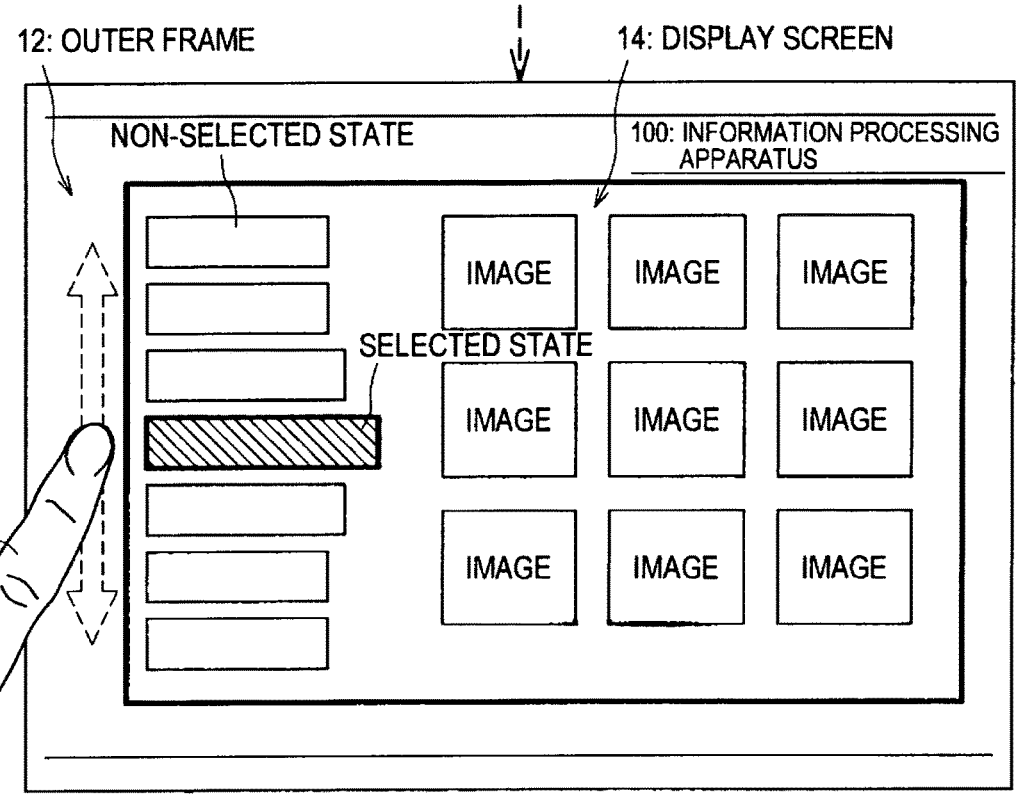

FIG.7
(SELECTING OPERATION)
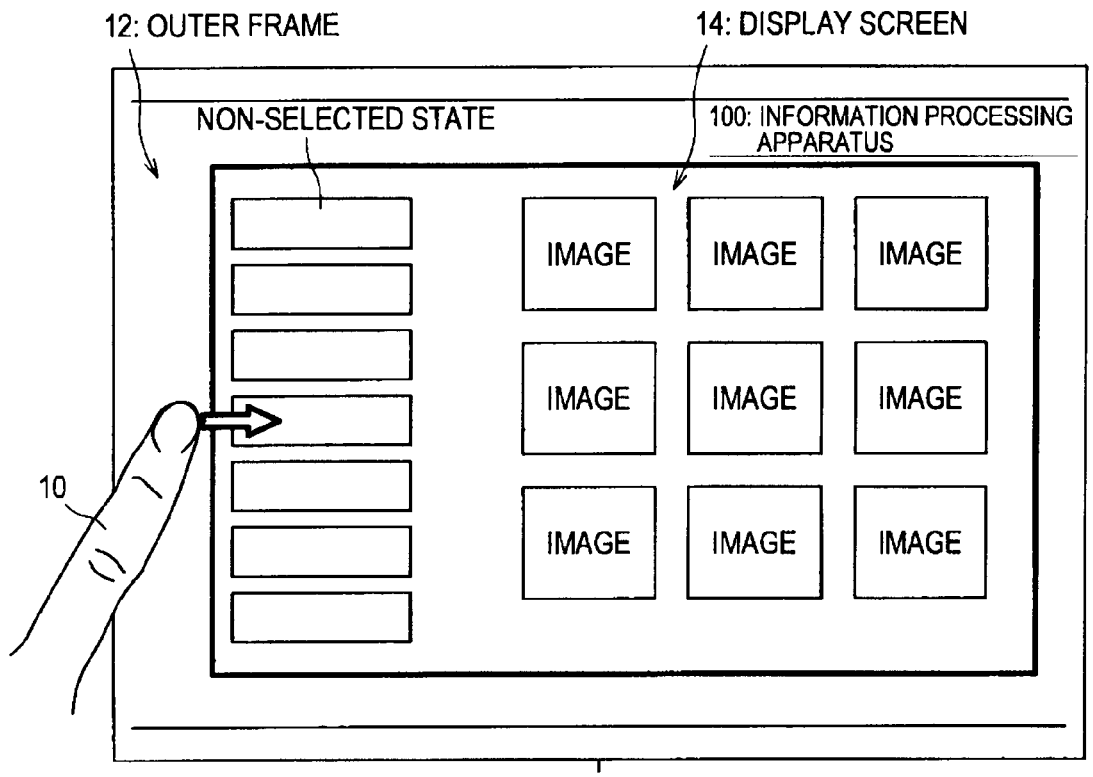
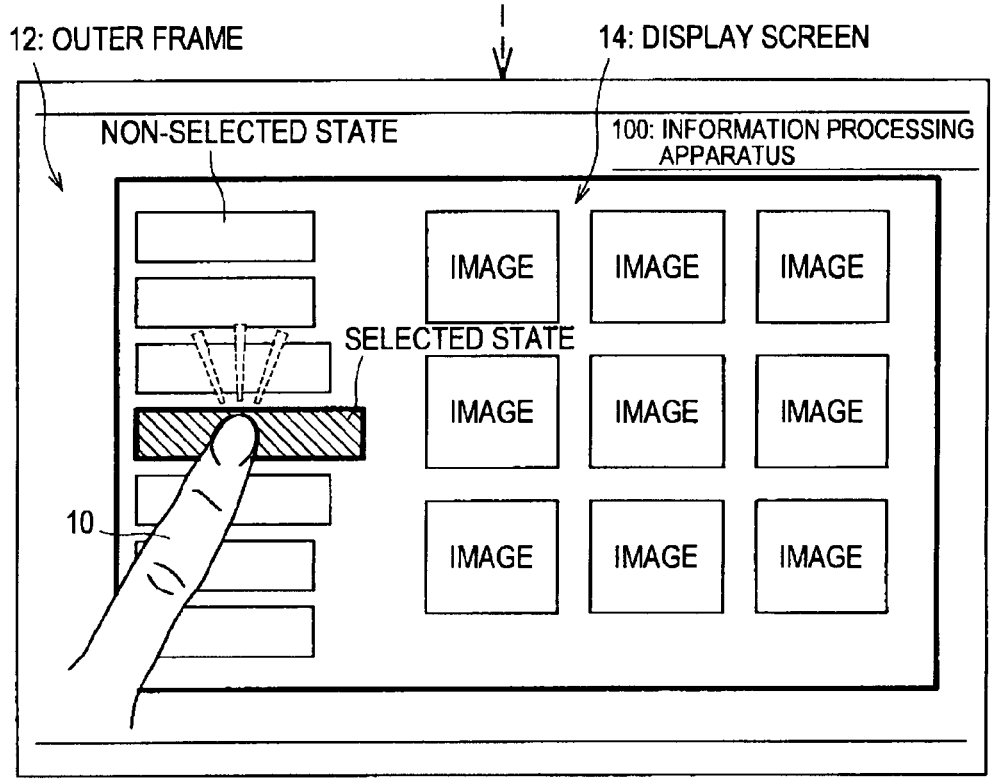

(DISPLAY OF AUXILIARY INFORMATION)

(SWITCH TO HIGH SPEED SCROLL MODE)

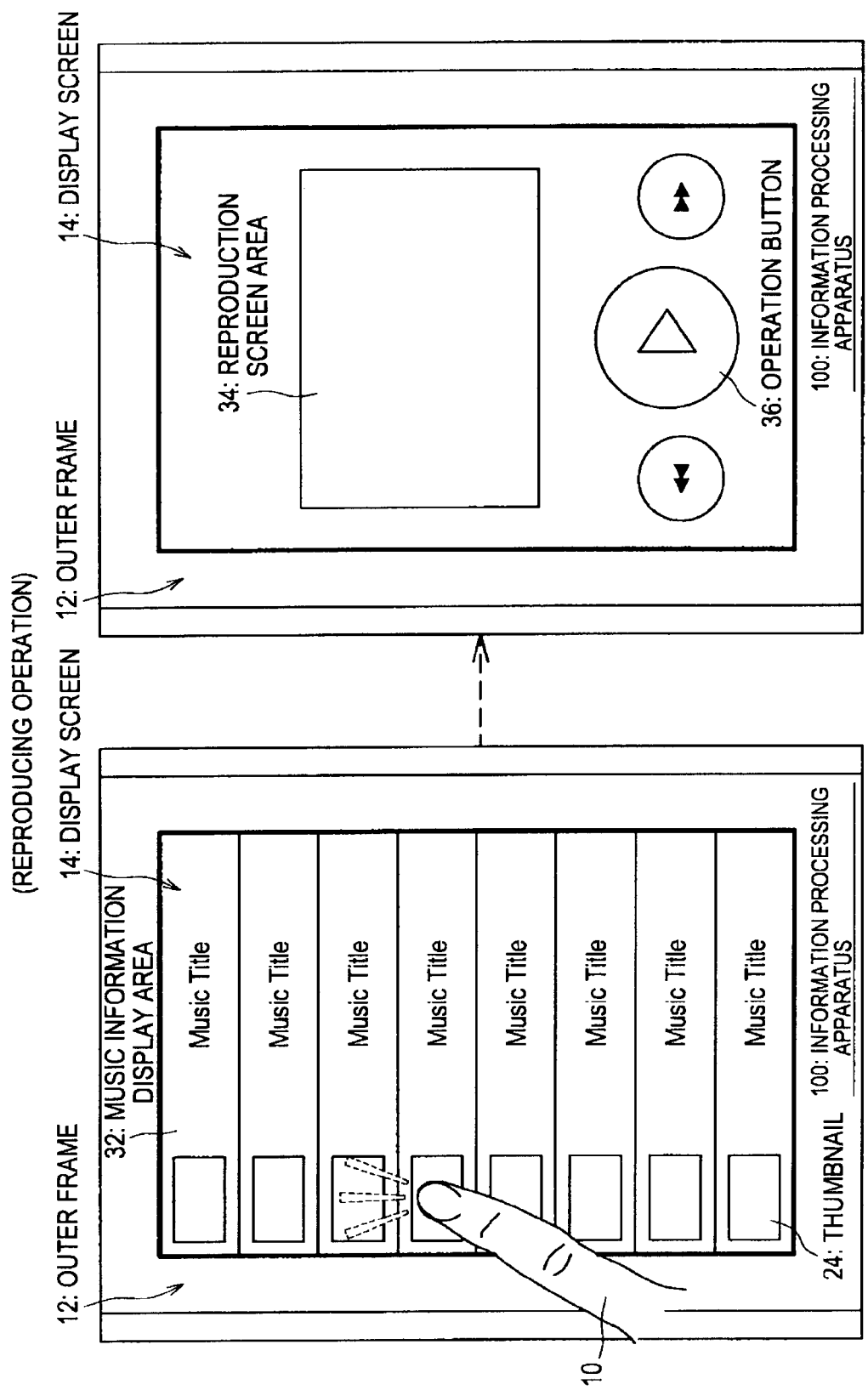

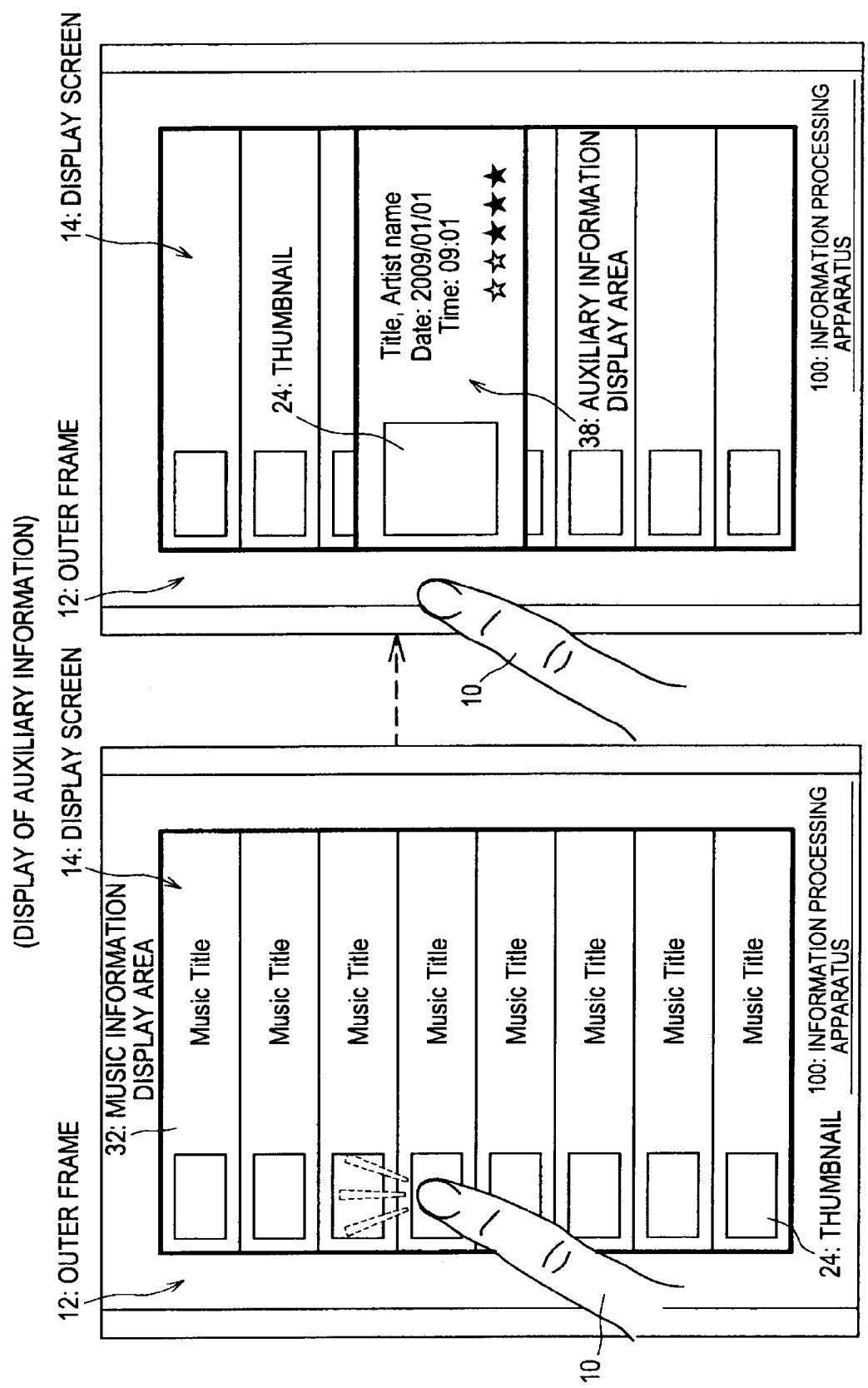

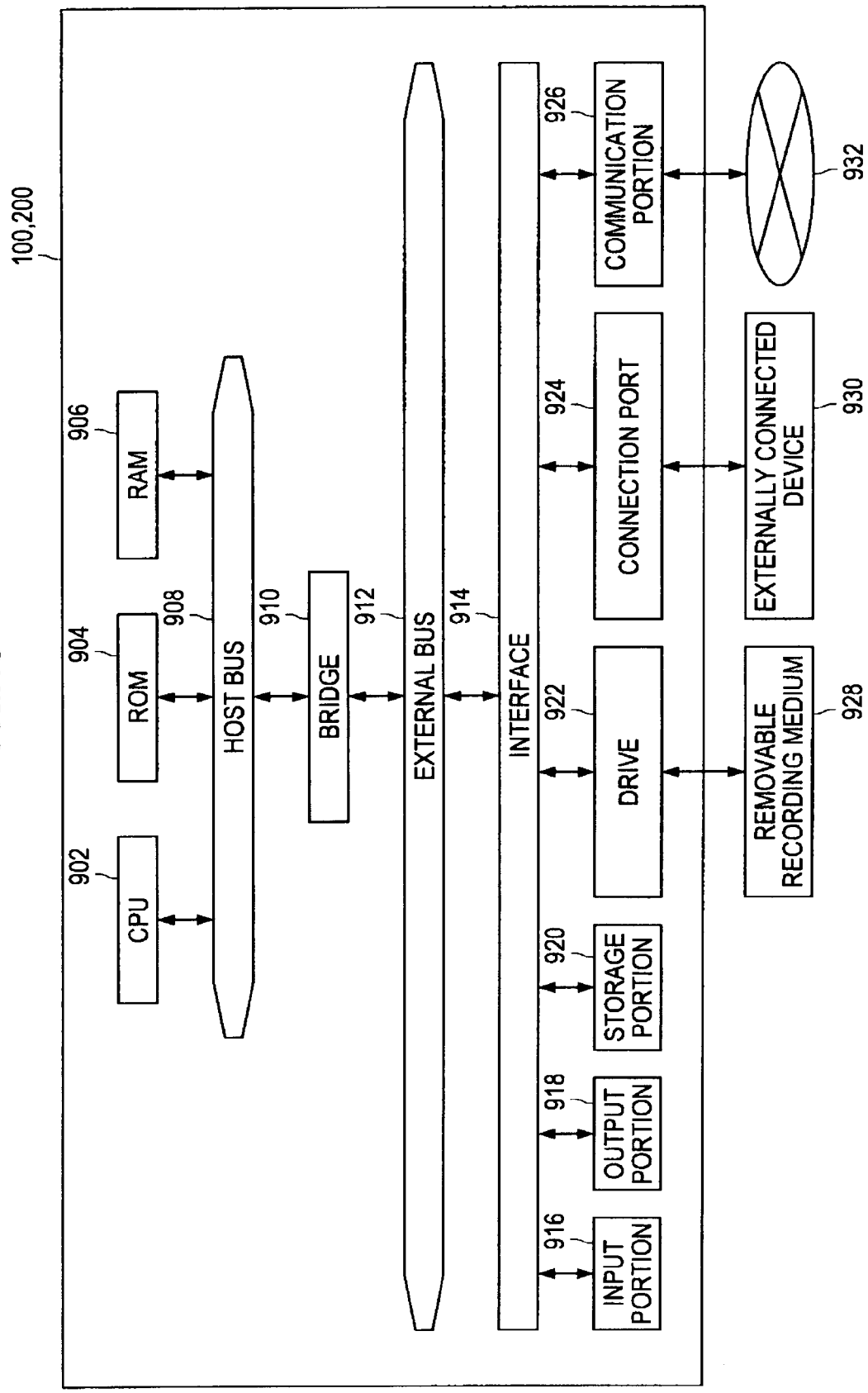

INFORMATION PROCESSING APPARATUS, DISPLAY CONTROL METHOD, AND PROGRAM

BACKGROUND OF THE INVENTION

Field of the Invention

The present invention relates to an information processing apparatus, a display control method, and a program.

Description of the Related Art

In recent years, many compact electronic devices use a touch panel as an input device for entering information and operating a graphical user interface (hereinafter, referred to as GUI). By using the touch panel, an input means such as a keyboard does not have to be separately provided, thereby making an electronic device compact. A touch panel is a display device for showing images and GUI. Accordingly, a user can realize an intuitional operation system while directly touching the images and GUI displayed on the touch panel. Due to this characteristic of the touch panel, it is mounted in various electronic devices, for example, portable information terminals, cellular phones, car navigation systems, laptop personal computers, information home electric appliances.

As mentioned above, a touch panel has an input device function as well as a display device function. The display device function is realized by using a display panel such as a liquid crystal display panel (hereafter, referred to as an LCD panel) and an organic electroluminescence display panel (hereafter, referred to as an OELD panel). On the other hand, the input device function is realized by providing a capacitive sensor on the display panel and providing an optical sensor for optically scanning an operating body which is put close to or in touch with the surface of the display panel. The sensor area which the capacitive sensor or the optical sensor can detect is often set in a pixel area (displayable area) of the display panel. Japanese Patent No. 4161814 discloses a technique in which a sensor area is expanded to a frame portion of a display panel and a more convenient operation system is realized with the expanded sensor area.

SUMMARY OF THE INVENTION

The operation method disclosed in Japanese Patent No. 4161814, however, is only an example of utilizing the sensor area expanded to the frame portion of the display panel. Therefore, some ideas are expected for realizing a further convenient operation system using the sensor area expanded to the frame portion of the display panel. In light of the foregoing, it is desirable to provide a novel and improved information processing apparatus, display control method, and program capable of realizing a further convenient operation system, using the sensor area expanded to the frame portion of the display panel.

According to an embodiment of the present invention, there is provided an information processing apparatus which includes an outer frame portion which forms an outer frame of a display portion where an object is displayed; a position detecting portion which detects a position of an operating body coming in touch with or close to the display portion or the outer frame portion; and a display controlling portion which displays on the display portion, auxiliary information about an object situated at a position of the operating body detected by the position detecting portion at a start of the shift when the operating body shifts to the outer frame portion while keeping touch with or close to the display portion.

Moreover, when the operating body having moved from the display portion to the outer frame portion shifts while keeping touch with or close to the outer frame portion, the display controlling portion may display on the display portion, auxiliary information about an object displayed at a corresponding position of the operating body detected by the position detecting portion after the shift.

Moreover, the information processing apparatus may further include an object selecting portion which turns an object displayed on the display portion into a first select state when the object is directly touched or approached by the operating body, according to the position of the operating body detected by the position detecting portion. In this case, when the operating body shifts to the display portion while keeping touch with or close to the outer frame portion, the object selecting portion may turn an object situated at a position of the operating body detected by the position detecting portion after the shift, into a second select state different from the first select state.

Moreover, the information processing apparatus may further include a content reproducing portion which reproduces a content corresponding to an object when the object is turned into the first select state by the object selecting portion. In this case, when an object is turned into the second select state by the object selecting portion, the content reproducing portion may display auxiliary information of the content corresponding to the object on the display portion.

Moreover, when the content is a music content, the content reproducing portion may display one or whole of information indicating a reproducing history of the music content, a reproducing time of a music, and a frequency of reproduction, on the display portion, as the auxiliary information of the content.

Moreover, when the content is a moving image content, the content reproducing portion may display one or whole of information indicating a reproducing history of the moving image content, a reproducing time of a moving image, and a frequency of reproduction, on the display portion, as the auxiliary information of the content.

Moreover, when the content is a static image content and the object is a folder corresponding to one or a plurality of the static image contents, the content reproducing portion may display a thumbnail image of the static image contents corresponding to an object set in the second select state, on the display portion, as the auxiliary information of the content.

According to another embodiment of the present invention, there is provided an information processing apparatus which includes an outer frame portion which forms an outer frame of a display where an object is displayed; a position detecting portion which detects a position of an operating body coming in touch with or close to the display portion or the outer frame portion; an area judging portion which judges whether the position of the operating body detected by the position detecting portion is in an area of the display portion or in an area of the outer frame portion, and a display controlling portion which scrolls display contents of the display portion at a first speed according to a shift of the operating body when the detected position is judged to be in the area of the display portion by the area judging portion and scrolls display contents of the display portion at a second speed different from the first speed according to the shift of the operating body when the detected position is judged to be in the area of the outer frame portion.

According to another embodiment of the present invention, there is provided a display control method, including the steps of detecting a position of an operating body coming in touch with or close to a display portion where an object is displayed or an outer frame portion which forms an outer frame of the display portion; and displaying auxiliary information, on the display portion, about an object situated at the position of the operating body detected through the position detecting step at a start of the shift when the operating body shifts to the outer frame portion while keeping touch with or close to the display portion.

According to another embodiment of the present invention, there is provided a display control method, including the steps of detecting a position of an operating body coming in touch with or close to a display portion where an object is displayed or an outer frame portion which forms an outer frame of the display portion; judging whether the position of the operating body detected through the position detecting step is in an area of the display portion or in an area of the outer frame portion; and scrolling display contents of the display portion at a first speed according to a shift of the operating body when the detected position is judged to be in the area of the display portion through the area judging step and scrolling display contents of the display portion at a second speed different from the first speed according to the shift of the operating body when the detected position is judged to be in the area of the outer frame portion.

According to another embodiment of the present invention, there is provided a program for causing a computer to realize the functions of: detecting a position of an operating body coming in touch with or close to a display portion where an object is displayed or an outer frame portion which forms an outer frame of the display portion; and displaying auxiliary information, on the display portion, about an object situated at the position of the operating body detected through the position detecting function at a start of the shift when the operating body shifts to the outer frame portion while keeping touch with or close to the display portion.

According to another embodiment of the present invention, there is provided a program for causing a computer to realize the functions of: detecting a position of an operating body coming in touch with or close to a display portion where an object is displayed or an outer frame portion which forms an outer frame of the display portion; judging whether the position of the operating body detected through the position detecting function is in an area of the display portion or in an area of the outer frame portion; and scrolling display contents of the display portion at a first speed according to a shift of the operating body when the detected position is judged to be in the area of the display portion through the area judging function and scrolling display contents of the display portion at a second speed different from the first speed according to the shift of the operating body when the detected position is judged to be in the area of the outer frame portion.

According to another embodiment of the present invention, there is provided a computer readable recording medium in which the program is recorded may be provided.

According to the embodiments of the present invention described above, a more convenient operation system can be realized by using the sensor area expanded to the frame portion of the display panel.

BRIEF DESCRIPTION OF THE DRAWINGS

FIG. 6 is an explanatory diagram showing an example of an operation method for performing a slide operation from the display screen to the outer frame before performing a drag operation while keeping a touch to the outer frame;

FIG. 7 is an explanatory diagram showing an example of an operation method for selecting an object through the slide operation from the outer frame to the display screen;

FIG. 13 is an explanatory diagram showing an example of an operation method for reproducing music data through the tap operation on the display screen;

FIG. 14 is an explanatory diagram showing an example of an operation method for displaying the auxiliary information of the music data through the tap operation on the outer frame; and FIG. 15 is an explanatory diagram showing an example of a hardware configuration capable of realizing the function of the information processing apparatus according to the respective embodiments of the invention.

DETAILED DESCRIPTION OF THE EMBODIMENTS

Figure 1:
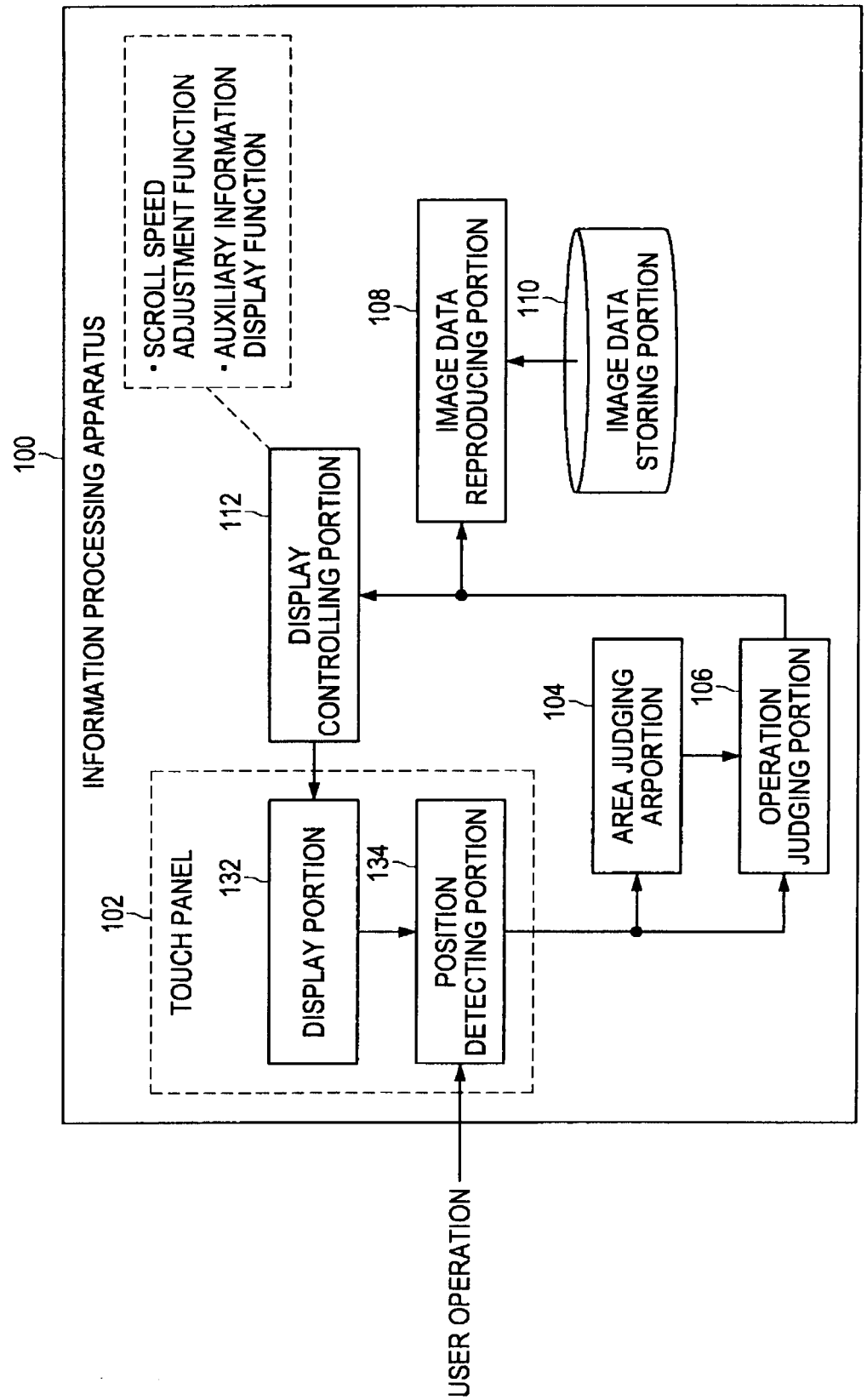
FIG. 1 is an explanatory diagram showing an example of a functional configuration of an information processing apparatus according to a first embodiment of the present invention.

Hereinafter, preferred embodiments of the present invention will be described in detail with reference to the appended drawings. Note that, in this specification and the appended drawings, structural elements that have substantially the same function and configuration are denoted with the same reference numerals, and repeated explanation of these structural elements is omitted.

[Flow of Description]

Here, a flow about embodiments of the invention as mentioned below will be briefly described. At first, with reference to FIG. 1, the functional configuration of an information processing apparatus 100 according to a first embodiment of the present invention will be described. In the first embodiment, an operation system and a display control method realized by the function of the information processing apparatus 100 will be described in detail with reference to FIGS. 2 to 11.

Figure 12:
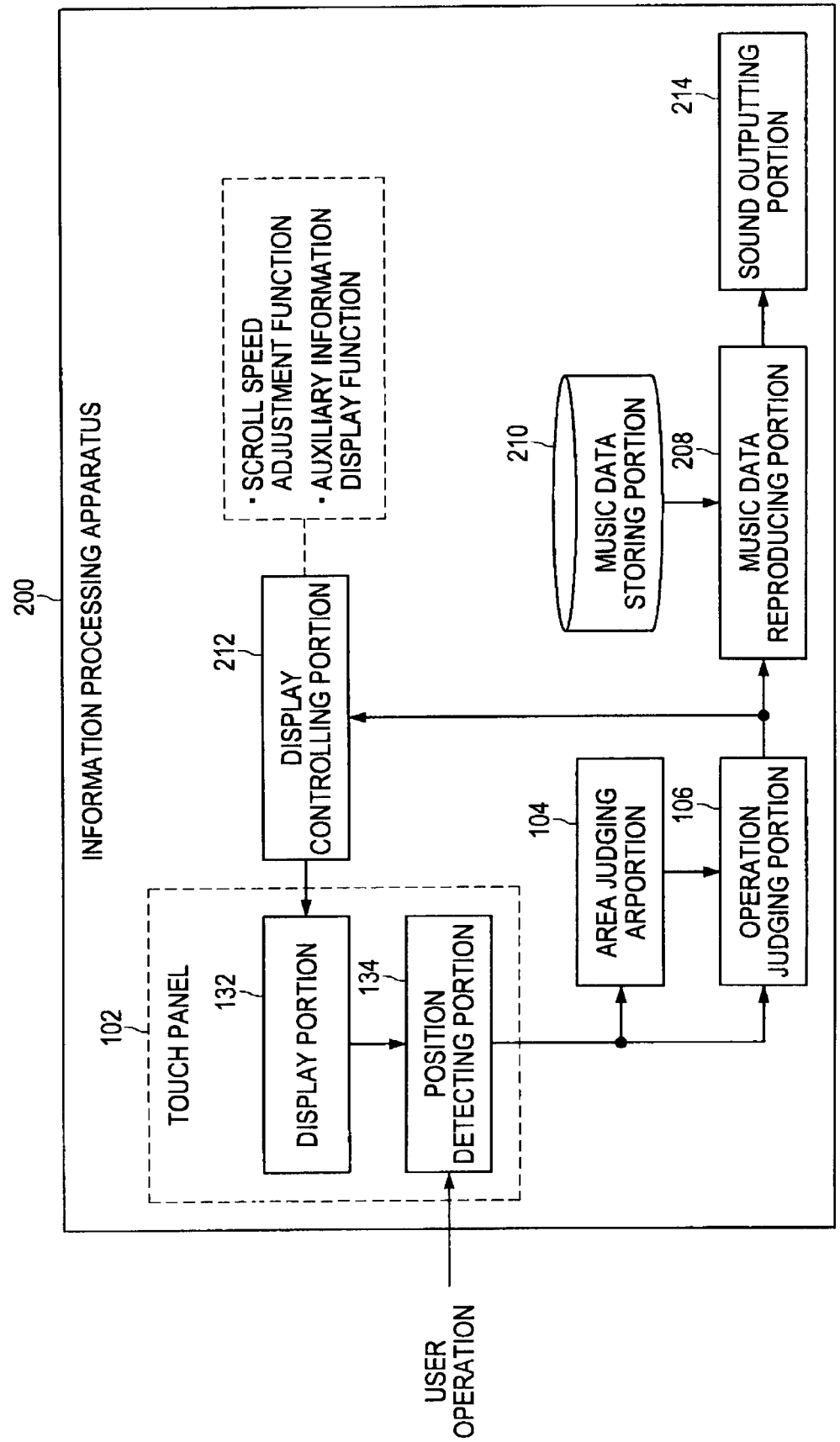
FIG. 12 is an explanatory diagram showing an example of a functional configuration of an information processing apparatus according to a second embodiment of the present invention.

Next, with reference to FIG. 12, the functional configuration of an information processing apparatus 200 according to a second embodiment of the present invention will be described. In the second embodiment, an operation system and a display control method realized by the function of the information processing apparatus 200 will be described in detail with reference to FIGS. 12 to 14.

Next, the configuration of the hardware capable of realizing the function of the information processing apparatuses 100 and 200 will be described with reference to FIG. 15. At the last, technical thought of the first and second embodiments will be summarized and the effects obtained from this technical thought will be briefly described.

(Description of Topics)

1: First Embodiment (Configuration about Image Data)

1-1: Functional Configuration of Information processing apparatus 100

1-2: Display Control Method by Information processing apparatus 100

2: Second Embodiment (Configuration about Music Data)

2-1: Functional Configuration of Information processing apparatus 200

2-2: Display Control Method by Information processing apparatus 200

3: Hardware Configuration of Information processing apparatus 100 and 200

4: Summary

1: First Embodiment (Configuration about Image Data)

At first, the first embodiment of the present invention will be described. This embodiment relates to a technique for realizing a more convenient operation system using a sensor area expanded to the outer frame of the display panel. In the embodiment, a method of displaying image data or auxiliary information of the image data and an effective display control method for displaying the above information are proposed here.

[1-1: Functional Configuration of Information Processing Apparatus 100]

At first, the functional configuration of the information processing apparatus 100 according to the first embodiment of the present invention will be described with reference to FIG. 1. FIG. 1 is an explanatory diagram showing an example of the functional configuration of the information processing apparatus 100 according to the embodiment.

As illustrated in FIG. 1, the information processing apparatus 100 includes a touch panel 102, an area judging portion 104, an operation judging portion 106, an image data reproducing portion 108, an image data storing portion 110, and a display controlling portion 112. Further, the touch panel 102 has a display portion 132 and a position detecting portion 134. The touch panel 102 may be replaced with arbitrary devices that can detect the position of a predetermined operating body when the operating body comes into touch with it or close to it. The operation judging portion 106 and the display controlling portion 112 are one example of an object selecting portion. Further, the image data reproducing portion 108 is one example of a content reproducing portion.

(Configuration of Touch Panel 102)

First, with reference to FIGS. 2 to 4, the configuration of the touch panel 102 in the embodiment will be described.

As mentioned above, the touch panel 102 includes the display portion 132 and the position detecting portion 134. The display portion 132 is a display device for displaying image data, auxiliary information of image data, or a graphical user interface (hereinafter, referred to as GUI) used for an input operation. As the GUI, for example, a button object, a menu object, a folder object, and information display object (dialogue balloon) are supposed. On the other hand, the position detecting portion 134 is a sensor device for detecting the position of a predetermined operating body when the operating body comes in touch with the touch panel 102 or close to it (hereinafter, referred to as "touch"). As the predetermined operating body, for example, a finger and a stylus pen are supposed.

(Touch Operation on Screen)

Figure 2:
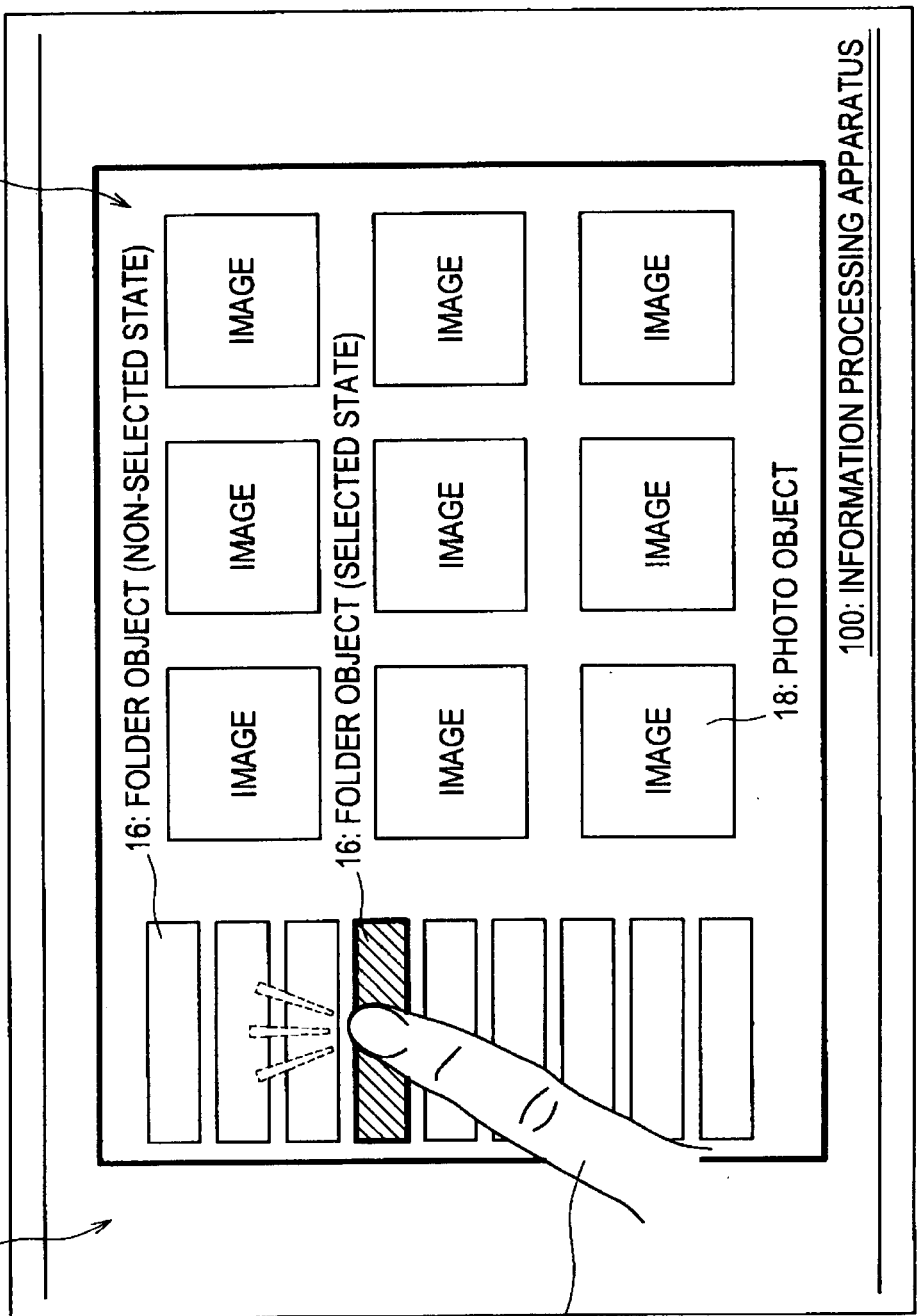
FIG. 2 is an explanatory diagram showing an example of an operation method for touching a display screen to select some operation.

At first, FIG. 2 is referred to. FIG. 2 illustrates an appearance configuration of the information processing apparatus 100. As illustrated in FIG. 2, the information processing apparatus 100 is provided with an outer frame 12 and a display screen 14. The display screen 14 shows image data and the like through the display portion 132. For example, the display screen 14 shows folder objects 16 and photo objects 18. Here, the folder object 16 has two modes: a selected state and a non-selected state.

The display screen 14 is provided with a sensor (position detecting portion 134) for detecting a touch position of the operating body 10. When the operating body 10 touches the display screen 14, the position detecting portion 134 detects the touch position and depending on the detected result, predetermined processing is performed. For example, when a user touches a folder object 16 displayed on the display screen 14 by the operating body 10, the folder object 16 corresponding to the touch position turns from a non-selected state to a selected state. Further, the photo object 18 corresponding to the folder object 16 is displayed on the display screen 14. It is needless to say that the behavior is merely one example.

As mentioned above, by providing the touch panel 102 as the operation means, a user is enabled to directly touch and operate the GUI displayed on the display screen 14. As the result, an intuitive operation system is realized.

(Touch Operation on Outer Frame)

Figure 3:
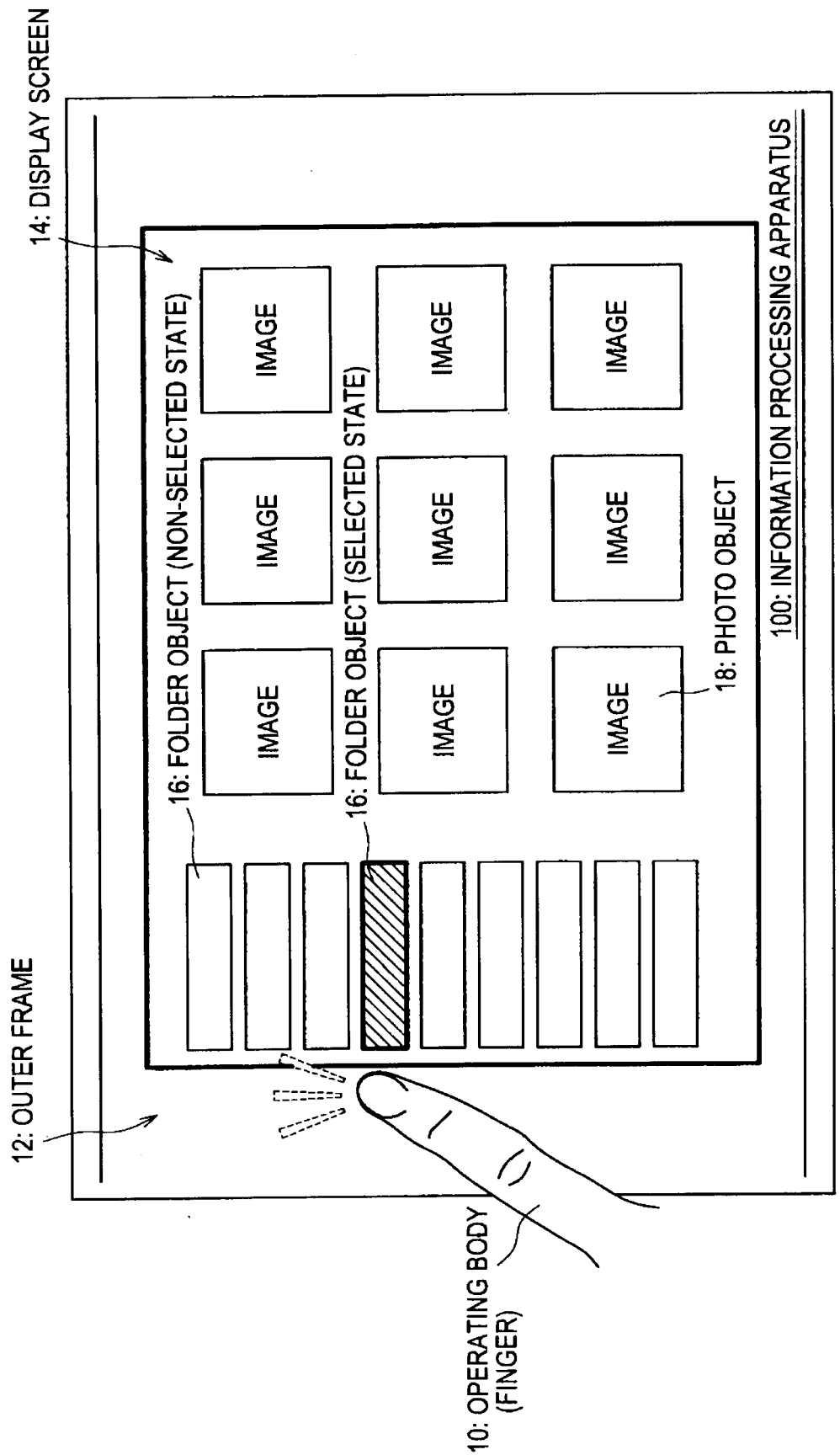
FIG. 3 is an explanatory diagram showing an example of an operation method for touching an outer frame to select some operation.

Further, in this embodiment, as illustrated in FIG. 3, the outer frame 12 is provided with a sensor configuration capable of detecting the position of the operating body 10 when it touches the outer frame 12. According to this configuration, a user can perform a predetermined operation depending on the touch position by touching the outer frame 12. For example, when a user touches a position of the outer frame 12 corresponding to the folder object 16 by the operating body 10, the display of the folder object 16 turns from the non-selected state to the selected state. Further, the photo object 18 corresponding to the folder object 16 is displayed on the display screen 14. Needless to say, the behavior is merely an example.

As mentioned above, by enabling the detection of a position of the outer frame 12 which the operating body 10 touches, a complicated operation system can be realized in combination with the operation using the GUI displayed on the display screen 14. Particularly, an operation (for example, a tap operation) performed on the outer frame 12 can be assigned to other behavior different from the behavior corresponding to the same operation performed on the display screen 14, and therefore, various operational forms can be realized without losing intuition. Further, since the number of the GUIs displayed on the display screen 14 can be reduced by giving ideas to the operational behavior, an effect of using the display screen 14 widely is expected.

(Expanding Method of Sensor Area)

Here, with reference to FIG. 4, a method of expanding a detectable area (sensor area) of the touch position by the operating body 10 to the outer frame 12 will be described.

Figure 4:
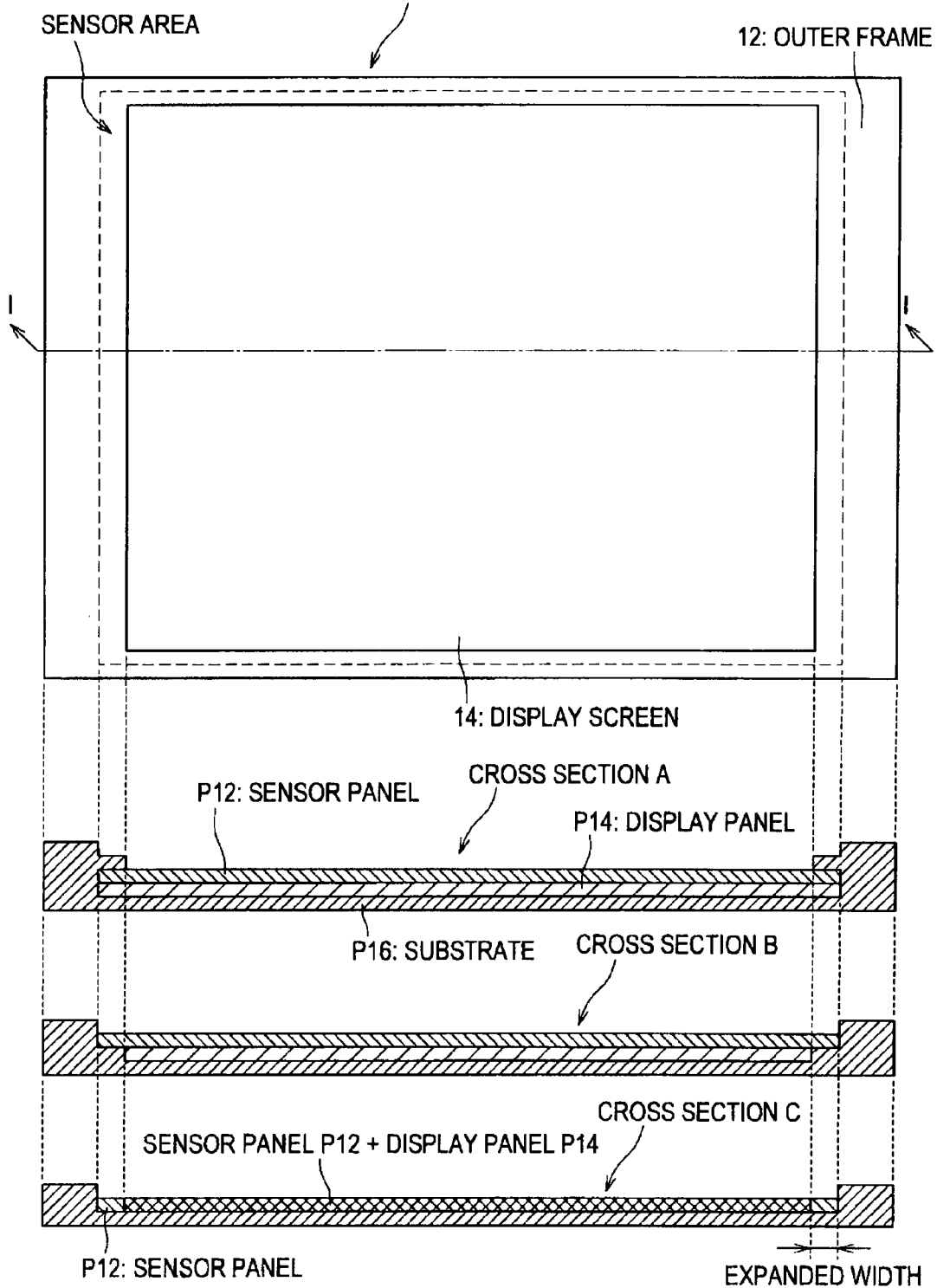
FIG. 4 is an explanatory diagram showing an example of a method for expanding a sensor area to the outer frame.

As a method of expanding the sensor area to the outer frame 12, there are, for example, some ways as illustrated by the cross-sectional views A, B, and C in FIG. 4. These cross-sectional views are obtained by cutting off the information processing apparatus 100 along the line I-I. The portion corresponding to the touch panel 102 of the information processing apparatus 100 mainly includes a sensor panel P12, a display panel P14, and a substrate P16. The sensor panel P12 corresponds to the position detecting portion 134. The display panel P14 corresponds to the display portion 132. As the display panel P14, for example, an LCD panel, an OELD panel, and the like are used.

(About Cross-Sectional View A)

The configuration of the cross-sectional view A features the size of the sensor panel P12 and the display panel P14. When the sensor area is restricted to the inside of the display screen 14 (hereinafter, referred to the general), the outer frame 12 portion is not provided with the display panel P14 and the sensor panel P12 in many cases. In the case of the cross-sectional view A, however, the outer frame 12 has the substrate P16, the display panel P14, the sensor panel P12, and the substrate P16 upwardly formed in a stacked configuration in this order similarly to the area of the display screen 14. Namely, in the case of the cross-sectional view A, the both layers of the sensor panel P12 and the display panel P14 provided in the portion of the display screen 14 are extended to the outer frame 12. The area of the outer frame 12 which is not used for image and GUI display is partially covered with the substrate P16. In other words, a shape of partially covering the display screen 14 with the substrate P16, in the general touch panel, corresponds to the configuration of the cross-sectional view A.

(About Cross-Sectional View B)

The configuration of the cross-sectional view B features the size of the sensor panel P12. In the case of the cross-sectional view A, also the display panel P14 is extended to the outer frame 12 portion, in addition to the sensor panel P12. The display panel P14, however, displays neither image nor GUI in its outer frame 12 portion. Therefore, the outer frame 12 does not have to be provided with the display panel P14. The configuration of the cross-sectional view B has only the sensor panel P12 extended to the outer frame 12 portion. Since the outer frame 12 portion does not include the display panel P14, the upper surface of the sensor panel P12 does not have to be covered with the substrate P16. The substrate P16 is not provided on the sensor panel P12. Namely, a shape of extending the sensor panel P12 to the outer frame 12, in the general touch panel, corresponds to the configuration of the cross-sectional view B.

(About Cross-Sectional View C)

The configuration of the cross-sectional view C features the configuration of the sensor panel P12. In this example, the sensor panel P12 arranged in the area of the display screen 14 is different from the sensor panel P12 arranged in the area of the outer frame 12. Here, the sensor panel P12 and the display panel P14 arranged in the area of the display screen 14 are combined together and illustrated. As mentioned above, the configurations of the cross-sectional views A and B correspond to the shape of extending the sensor panel P12 and/or the display panel P14 to the outer frame 12. The configuration of the cross-sectional view C, however, does not have the sensor panel P12 extended to the outer frame 12 but has a separate sensor panel P12 in the area of the outer frame 12. Similarly to the above cross-sectional view B, since there is no display panel P14 in the area of the outer frame 12, the upper surface of the sensor panel P12 is not covered with the substrate P16.

By using one of the above configurations of the cross-sectional view A, the cross-sectional view B, and the cross-sectional view C, the sensor area can be extended to the outer frame 12. In this embodiment, the touch panel 102 with the sensor area thus extended to the outer frame 12 is supposed. Here, as the sensor panel P12, for example, a capacitive sensor and a piezoelectric sensor are used.

As mentioned above, the configuration of the touch panel 102 according to the embodiments has been described. In the below, referring to FIG. 1 again, the functions of the respective components of the information processing apparatus 100 will be described.

(Position Detecting Portion 134)

At first, when a user touches the touch panel 102 by the operating body 10, the position detecting portion 134 detects the touch position by the operating body 10. For example, the position detecting portion 134 specifies the touch position by the operating body 10 according to the positional coordinates with an original point set at a predetermined position of the touch panel 102 as a reference. When the whole area of the touch panel 102 is divided into block areas having a predetermined size, the position detecting portion 134 specifies a block corresponding to the touch position. The information of the touch position specified by the position detecting portion 134 (hereinafter, referred to as touch position information) is input to the area judging portion 104 and the operation judging portion 106.

(Area Judging Portion 104)

As mentioned above, the touch position information is input to the area judging portion 104 from the position detecting portion 134. Upon receipt of the touch position information from the position detecting portion 134, the area judging portion 104 judges whether the position specified according to the touch position information is included in the area of the display screen 14 (hereinafter, referred to as a screen area) or in the area of the outer frame 12 (hereinafter, referred to as a frame area). For example, the area judging portion 104 keeps the coordinate range of the screen area and the coordinate range of the frame area as the range information and collates the range information with the touch position information, hence to obtain the result (hereinafter, referred to as area information). The area information obtained by the area judging portion 104 is input to the operation judging portion 106.

(Operation Judging Portion 106)

As mentioned above, the touch position information is input to the operation judging portion 106 from the position detecting portion 134. Further, the area information is input to the operation judging portion 106 from the area judging portion 104. Upon receipt of the information, the operation judging portion 106 judges a type of the operation, according to the combination of the input touch position information and the area information. For example, the operation judging portion 106 keeps a table of relating a predetermined combination of the touch position information and the area information correspondingly to a predetermined type of operation and judges a type of operation corresponding to the input combination with reference to the table. The judgment result by the operation judging portion 106 is input to the image data reproducing portion 108 and the display controlling portion 112.

For example, when the operation judging portion 106 detects a tap operation, according to the touch position information and detects the touch position in the frame area, according to the area information, it outputs the type of the operation corresponding to the tap operation of the frame area (for example, an object selecting operation) as the judgment result. Here, the tap operation means an operation of touching the surface by the operating body 10 and soon getting away. Hereinafter, the processing of the operation judging portion 106 will be described in detail according to the concrete example.

(Tap Operation 1: Screen Area)

For example, when the tap operation is performed on the display screen 14, as illustrated in FIG. 2, the operation judging portion 106 receives the touch position information indicating the substantially same position for a short time and receives the area information indicating the screen area. When the tap operation of the screen area is related to the selecting behavior of GUI, the operation judging portion 106 judges that the type of the operation performed by a user is a selecting operation on the folder object 16 displayed at the position corresponding to the touch position information. Then, the operation judging portion 106 inputs the judgment result to the display controlling portion 112. As the result, as illustrated in FIG. 2, the display of the folder object 16 turns from a non-selected state to a selected state, according to the user's operation. Further, the photo object 18 corresponding to the folder object 16 is displayed on the display screen 14.

(Tap Operation 2: Frame Area)

As another example, when the tap operation is performed on the outer frame 12, as illustrated in FIG. 3, the operation judging portion 106 receives the touch position information indicating the substantially same position for a short time and receives the area information indicating the frame area. When the tap operation of the frame area is related to the selecting behavior of GUI, the operation judging portion 106 judges that the type of the operation performed by a user is a selecting operation on the folder object 16 displayed at the position corresponding to the touch position information. The operation judging portion 106 inputs the judgment result to the display controlling portion 112. As the result, as illustrated in FIG. 3, the display of the folder object 16 turns from a non-selected state to a selected state according to the user's operation. Further, the photo object 18 corresponding to the folder object 16 is displayed on the display screen 14.

(Drag Operation 1: Screen Area)

Figure 5:
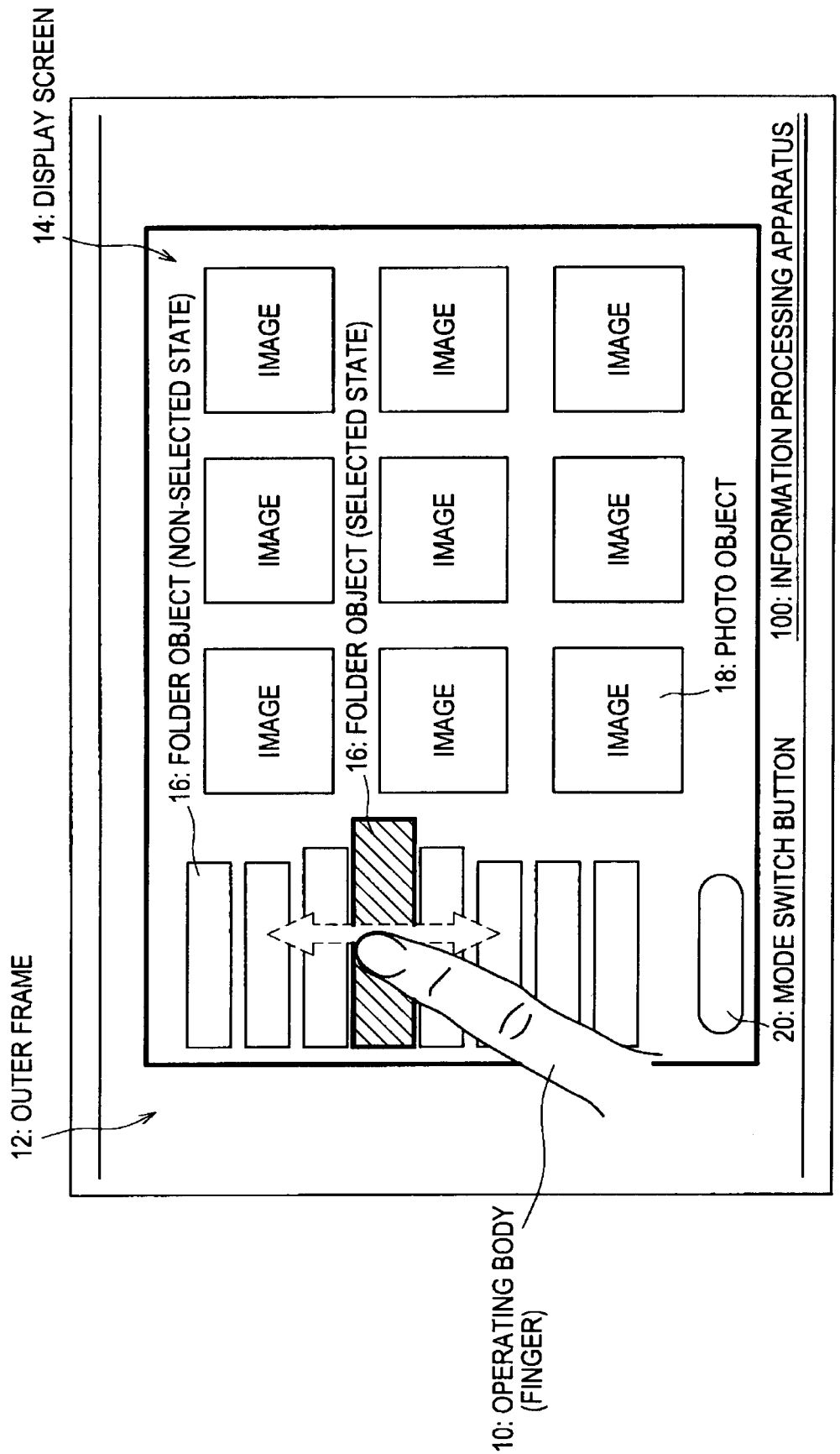
FIG. 5 is an explanatory diagram showing an example of an operation method for performing a drag operation on the display screen.

As further another example, as illustrated in FIG. 5, the case of relating the drag operation to the scroll behavior can be considered. The drag operation is an operation for moving the operating body 10 with it kept in touch with the surface. When the drag operation is performed on the display screen 14 as illustrated in FIG. 5, the operation judging portion 106 receives the touch position information which continuously changes in some direction according to the elapse of time and receives the area information indicating the screen area. In this example, since the drag operation of the screen area is related to the scroll behavior, the operation judging portion 106 judges that the type of the operation performed by a user is the scroll operation with the touch position as a reference. The judgment result is input to the display controlling portion 112 and for example, the folder object 16 displayed on the display screen 14 is scrolled.

(Drag Operation 2: Screen Area→Frame Area)

As mentioned above, the examples illustrated in FIGS. 2, 3, and 5 are to illustrate the processing methods about the operations performed in the respective areas. The information processing apparatus 100 includes the area judging portion 104 and therefore, it can judge the screen area and the frame area at real time, predetermined behavior can be related to an operation of crossing the screen area and the frame area. A concrete example of the processing method about the operation of crossing over the area is illustrated in FIG. 6. With reference to FIG. 6, an example of relating an operation of dragging from the screen area to the frame area to mode switching behavior will be considered. Here, as an example of the mode switching behavior, the switching behavior to the high speed scroll mode is considered.

When it does not have such a function as the area judging portion 104, it is necessary to use a mode switch button 20, for example, as illustrated in FIG. 5, in order to realize the switching operation to a high speed scroll mode. Namely, a user has to tap the mode switch button 20 to switch in the high speed scroll mode and then do the drag operation. Therefore, operational process is increased by the tap operation of the mode switch button 20. On the contrary, as illustrated in FIG. 6, when the drag operation from the display screen 14 to the outer frame 12 is related to the mode switching operation, a user can realize the high speed scroll behavior in the drag operation continuously without taking off the operating body 10 from the touch panel 102.

For example, when the drag operation as illustrated in FIG. 6 is performed, the operation judging portion 106 receives the touch position information which continuously changes in some direction together with the elapse of time and at the same time, receives the area information indicating the screen area as well as the area information indicating the frame area. Here, the operation judging portion 106 can judge the moving direction of the operating body 10 according to the input sequence of the area information of the screen area and the area information of the frame area. Therefore, the operation judging portion 106 can judge that the operating body 10 shifts from the screen area to the frame area during the continuous drag operation, according to the input information.

When the drag operation from the screen area to the frame area is related to the mode switching operation to the high speed scroll mode, the operation judging portion 106 judges that the user's operation is the mode switching operation to the high speed scroll mode. The judgment result is input from the operation judging portion 106 to the display controlling portion 112, for example, the folder object 16 displayed on the display screen 14 is scrolled at a high speed. Here, the drag operation from the screen area to the frame area can be related to several types of behavior. In this case, the operation judging portion 106 judges a type of behavior corresponding to the user's operation, according to what operation form (for example, the presence/absence of the drag operation) of the operating body 10 is performed within the screen area or the frame area before or after the drag operation of crossing over the area.

(Drag Operation 3: Frame Area→Screen Area)

As illustrated in FIG. 7, the drag operation from the outer frame 12 to the display screen 14 may be related to predetermined behavior. In the example of FIG. 7, the drag operation of crossing over the area is related to the selecting behavior of GUI, similarly to the tap operation (refer to FIG.

2) in the display screen 14. When the drag operation as illustrated in FIG. 7 is performed, the operation judging portion 106 receives the touch position information which continuously changes in some direction together with the elapse of time and at the same time, receives the area information indicating the screen area as well as the area information indicating the frame area.

The operation judging portion 106 can judge the moving direction of the operating body 10 according to the input sequence of the area information of the screen area and the area information of the frame area. Therefore, the operation judging portion 106 judges that the operating body 10 shifts from the frame area to the screen area during the continuous drag operation, according to the input information. The operation judging portion 106 judges that the user's operation is a selecting operation of GUI. This judgment result is input to the display controlling portion 112 and, for example, the folder object 16 displayed on the display screen 14 turns from a non-selected state to a selected state. By judging the input sequence of the area information as mentioned above, moving direction in crossing over the area can be related to a corresponding type of operation.

(Drag Operation 4: Display of Auxiliary Information)

Figure 8:
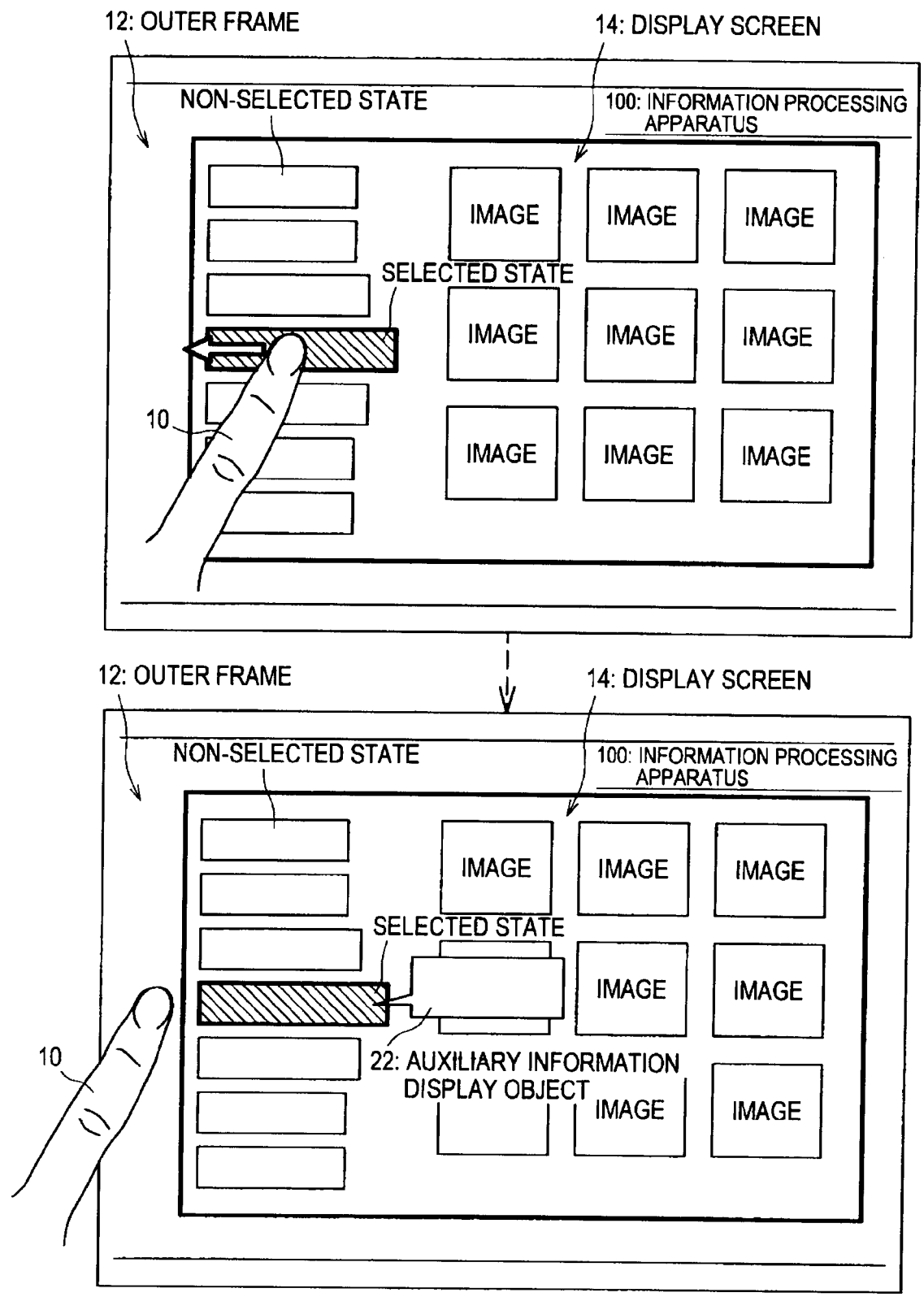
FIG. 8 is an explanatory diagram showing an example of an operation method for turning an object into a selected state on the display screen and then performing a slide operation to the outer frame, hence to display an auxiliary information of the object.

As illustrated in FIG. 8, the drag operation from the display screen 14 to the outer frame 12 may be related to predetermined behavior. In the example of FIG. 8, the drag operation of crossing over the area is related to the display behavior of an auxiliary information display object 22. This auxiliary information display object 22 is a display object for displaying auxiliary information about GUI and image data. Here, the auxiliary information includes, for example, the number of image data, data size, shooting date of image data, and reproduction hour of moving image data corresponding to the folder object 16.

When the drag operation as illustrated in FIG. 8 is performed, the operation judging portion 106 receives the touch position information which continuously changes in some direction together with the elapse of time and simultaneously receives the area information indicating the screen area as well as the area information indicating the frame area. Here, the operation judging portion 106 can judge the moving direction of the operating body 10 according to the input sequence of the area information of the screen area and the area information of the frame area. Therefore, the operation judging portion 106 judges that the operating body 10 shifts from the screen area to the frame area during the continuous drag operation, according to the input information. The operation judging portion 106 judges that the user's operation is a display operation of the auxiliary information display object 22.

When the above judgment result is input from the operation judging portion 106 to the display controlling portion 112, the auxiliary information display object 22 is displayed on the display screen 14. In the auxiliary information display object 22, GUI (folder object 16) corresponding to the position of the operating body 10 or the auxiliary information of the image data about the GUI is displayed. According to this configuration, a user is enabled to specify a desired GUI during the continuous drag operation and display the auxiliary information, without taking off the operating body 10 from the touch panel 102, in order to display the auxiliary information display object 22.

As the merits common to the operation systems illustrated in FIGS. 6, 7, and 8, there are a point of reducing the operation process and a point of saving the operation of displaying the GUI on the display screen 14 in order to perform the operation process. In other words, they can obtain not only the effect of improving the operability but also the effect of widely using the display screen 14. The examples illustrated in FIGS. 6 to 8 are only one example of the operation system that can be realized by the information processing apparatus 100 and the technical range of this embodiment is not restricted to the above. For example, a further improved example of the configuration illustrated in FIG. 8 is shown in FIG. 9.

Figure 9:
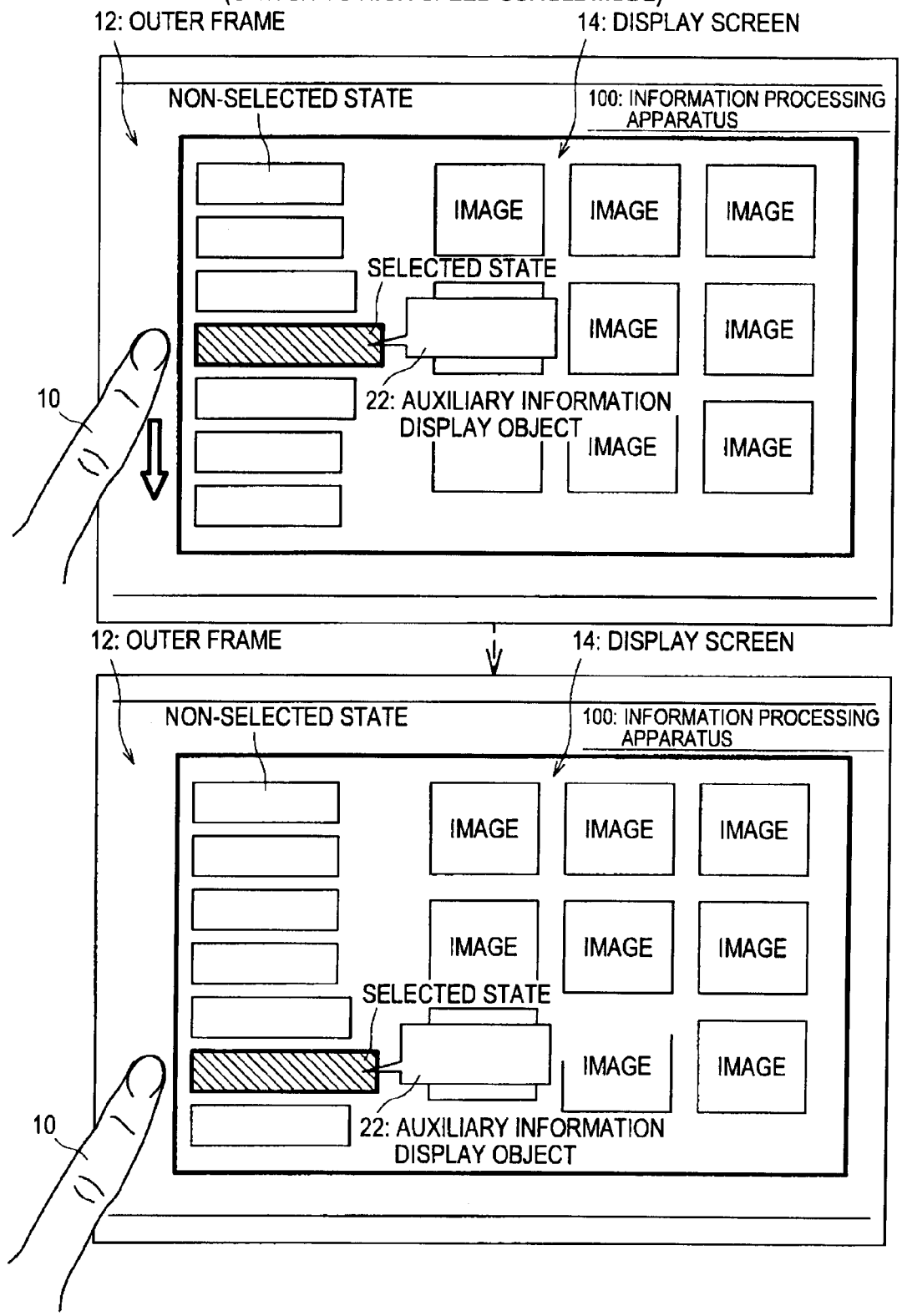
FIG. 9 is an explanatory diagram showing an example of an operation method for performing the slide operation to the outer frame in a state with the auxiliary information of the object displayed, hence to display auxiliary information of a different object.

The example of FIG. 8 shows the processing up to the display operation of the auxiliary information display object 22, while the example of FIG. 9 shows an operation of changing the GUI corresponding to the auxiliary information display object 22. The operation of FIG. 9 is to be performed continuously to the operation illustrated in FIG. 8. In the case of the example illustrated in FIG. 9, after the auxiliary information display object 22 is displayed, a user moves the operating body 10 in the area of the outer frame 12 and changes the auxiliary information displayed in the auxiliary information display object 22. Here, the display target of the auxiliary information display object 22 is changed to the GUI corresponding to the position of the operating body 10 and according to the change of the GUI, the contents of the auxiliary information displayed in the auxiliary information display object 22 are also changed.

When a user performs the changing operation of the auxiliary information display object 22, the operation judging portion 106 receives the touch position information which continuously changes in some direction together with the elapse of time and at the same time, receives the area information indicating the frame area. Since the operation illustrated in FIG. 9 is performed continuously to the operation illustrated in FIG. 8, the operation judging portion 106 recognizes that it is the display operation of the auxiliary information display object 22. Therefore, the operation judging portion 106 can judge the shift of the operating body 10 in the frame area not as the scroll operation but as the changing operation of the auxiliary information display object 22. The judgment result is input to the display controlling portion 112 and reflected in the display position and display contents of the auxiliary information display object 22.

The important point here is that the operation a user performs is only the drag operation. For example, taking the display operation of the auxiliary information display object 22 illustrated in FIGS. 8 and 9 for instance, a user keeps touching the display screen 14 and drags it to the outer frame 12, just continuing the drag operation on the outer frame 12. During the continuous drag operation, a user can move the operating body 10 to the position of the GUI where he or she wants to display the auxiliary information and display the desired auxiliary information display object 22. This operation system can be realized by utilizing the area judgment function by the area judging portion 104 and the above judgment function by the operation judging portion 106.

The operation judging portion 106 inputs the information indicating the moving direction, position, and shift amount of the operating body 10, into the display controlling portion 112, in addition to the information indicating the type of an operation. When the input combination of the touch position information and the area information is related to the reproducing behavior of the image data (or video data), the operation judging portion 106 inputs the information indicating the image data to be reproduced, into the image data reproducing portion 108.

Further, an operation of crossing the screen area and the frame area may be related to several types of behavior. In this case, the operation judging portion 106 judges a type of behavior according to the moving direction and the operation pattern of the operating body 10 detected before or after crossing over the area. For example, when the previous operation before crossing over the area is the drag operation corresponding to the scroll behavior, the operation judging portion 106 judges the operation of crossing over the area as a mode switching operation of switching the mode to a high speed scroll mode. While, when the previous operation of crossing over the area is the tap operation, the operation judging portion 106 judges the operation of crossing over the area as the display operation of the auxiliary information display object 22.

(Complement of Operation of Crossing Over Area)

Here, the description about the function of the operation judging portion 106 will be briefly complemented. As mentioned above, the operation judging portion 106 receives the area information from the area judging portion 104. Further, the operation judging portion 106 receives the touch position information from the position detecting portion 134. Therefore, the operation judging portion 106 can judge the tap operation and the drag operation, according to the continuity of the touch position information. When the operation judging portion 106 judges that it is the drag operation based on the touch position information, it can judge whether it is an operation of crossing over the area, by checking whether the area information changes during the drag operation.

Further, the operation judging portion 106 can judge the direction of the drag operation, the drag distance within each area, and the drag speed, according to the touch position information. These judgment results are input to the display controlling portion 112 depending on necessity. The operation judging portion 106 can judge a type of each operation performed in each area before or after the operation of crossing over the area, according to the touch position information before or after the area information changes. Therefore, the operation judging portion 106 can switch the behavior correspondingly, according to the type of the operation performed before or after the operation of crossing over the area.

Since the operation performed in each area can be judged as mentioned above, the same object is able to have two different select states assigned. For example, when a user touches an object of the screen area, the object turns in a first select state and when he or she touches the position of the frame area corresponding to the same object, it turns in a second select state. Further, when the operation of crossing over the area is performed, an object can be changed from the first select state to the second select state before or after the operation. For example, with an object turned into the first select state in the screen area (frame area), it is dragged to the frame area (the screen area) as it is, when the same object is turned into the second select state.

For example, the case of FIG. 8 shows that the transition to the second select state is assigned to the display operation of the auxiliary information display object 22. Besides, for example, in the transition to the first select state, an image corresponding to the object may be displayed in full screen and in the transition to the second select state, the thumbnail image of the image corresponding to the object may be displayed as a list. Other than the display operation, for example, mail transmitting behavior of image data may be performed in the transition to the first select state and compression behavior of image data may be performed in the transition to the second select state. The transition state can be judged by the above function of the operation judging portion 106.

(Image Data Reproducing Portion 108 and Image Data Storing Portion 110)

FIG. 1 is referred to again. As mentioned above, the image data reproducing portion 108 receives the information indicating image data to be reproduced (hereinafter, referred to as reproduction image data information) from the operation judging portion 106. Upon receipt of the reproduction image data information, the image data reproducing portion 108 reads out the image data indicated by the received information from the image data storing portion 110 and inputs it into the display controlling portion 112. Here, the image data reproducing portion 108 performs predetermined necessary image processing and decoding processing on the image data, depending on the type of the image data and inputs the output signals into the display controlling portion 112. The image data here may include not only static image data but also moving image data.

(Display Controlling Portion 112 and Display Portion 132)

As mentioned above, the display controlling portion 112 receives the signals of the image data from the image data reproducing portion 108. Upon receipt of the signals of the image data, the display controlling portion 112 displays the image on the display portion 132, according to the received signals. Further, the display controlling portion 112 receives a type of operation and various information necessary for realizing the display behavior corresponding to the operation, from the operation judging portion 106. The display controlling portion 112 updates the GUI and image data displayed on the display portion 132, according to the received information and signals. For example, the display controlling portion 112 changes the display of the folder object 16 from the non-selected state to the selected state, as illustrated in FIGS. 2, 3, and 7, and displays the photo object 18 corresponding to the folder object 16.

The display controlling portion 112 scrolls the selected folder object 16 as illustrated in FIGS. 5 and 6, or the display contents. When the display controlling portion 112 receives the information indicating a switching operation to a high speed scroll mode from the operation judging portion 106, it scrolls the display contents at high speed. For example, the display controlling portion 112 changes the amount of scroll accompanied by the drag operation of the operating body 10 to a larger amount than the usual scroll mode and scrolls the display contents at the changed scroll amount.

Figure 10:
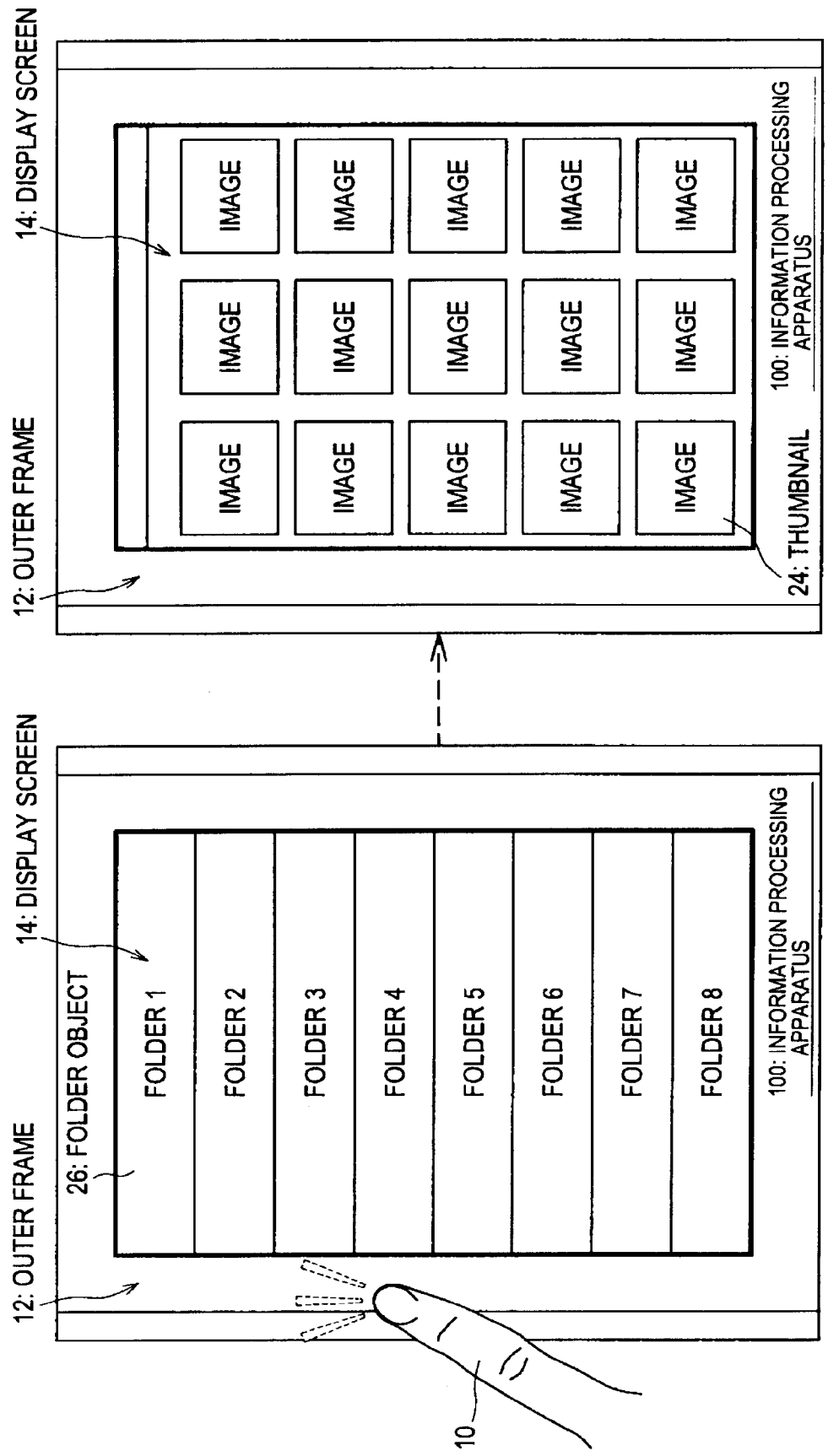
FIG. 10 is an explanatory diagram showing an example of an operation method for displaying image data within a folder through a tap operation on the outer frame.
Figure 11:
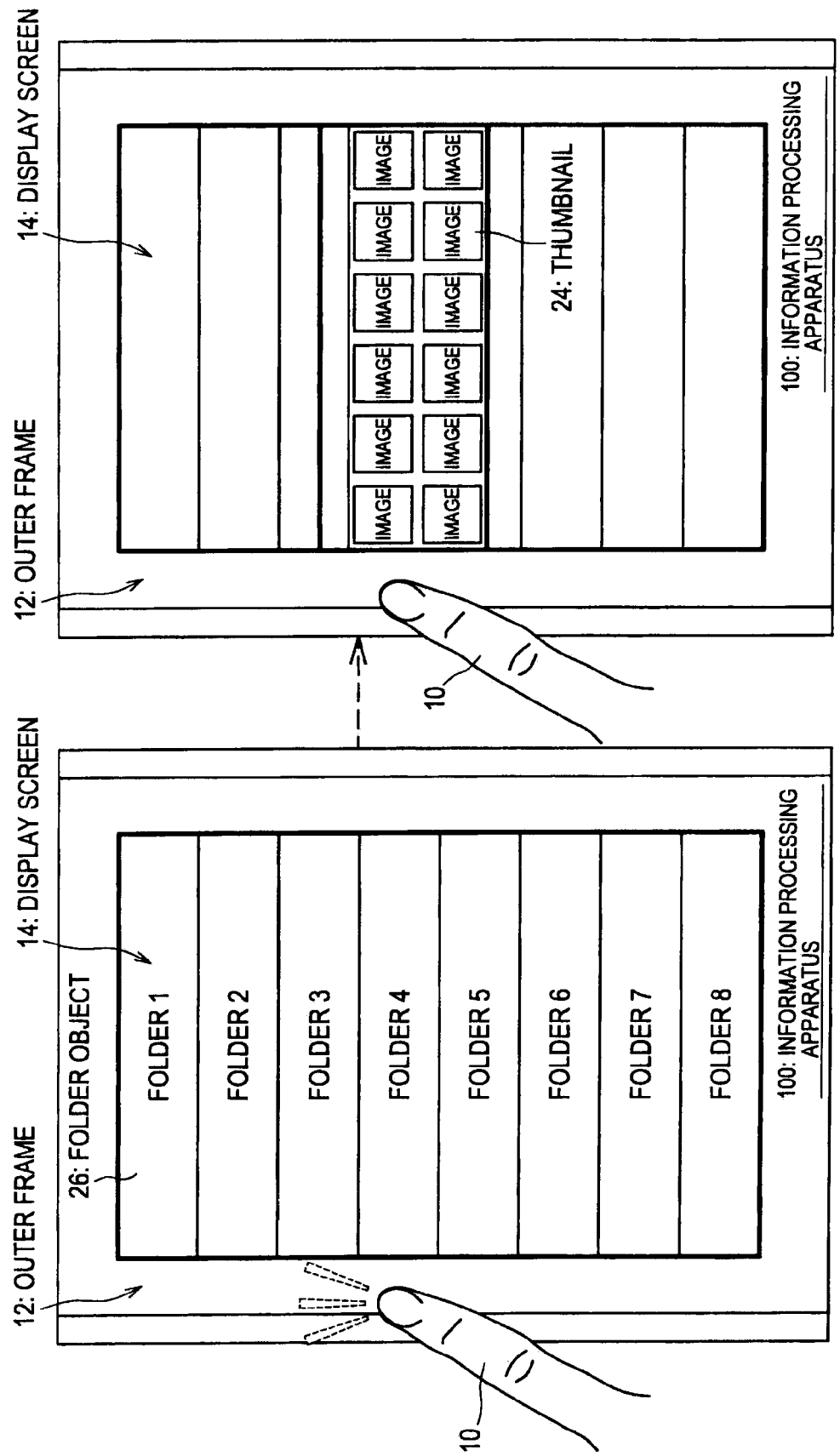
FIG. 11 is an explanatory diagram showing an example of an operation method for displaying the auxiliary information about the image data within the folder through the tap operation on the outer frame.

Further, the display controlling portion 112 has a function of displaying the auxiliary information display object 22, as illustrated in FIGS. 8 and 9. Here, the display controlling portion 112 displays the auxiliary information display object 22 near the position of the operating body 10 input from the operation judging portion 106. The display controlling portion 112 may be configured to display a thumbnail 24 of image data corresponding to each folder object 26 as the auxiliary information, as illustrated in FIGS. 10 and 11. Further, the display controlling portion 112 may display the shooting date and the data size of image data in combination with the thumbnail 24 as the auxiliary information. The example of FIG. 10 is to illustrate the display example in the case of displaying the auxiliary information in a full screen. On the other hand, the example of FIG. 11 is to illustrate the display example in the case of displaying the auxiliary information in a window.

As mentioned above, the functional configuration of the information processing apparatus 100 according to the first embodiment of the present invention has been described. As mentioned above, the information processing apparatus 100 has the touch panel 102 with the sensor area expanded to the outer frame 12 and a function of judging the area corresponding to the touch position of the operating body 10 detected by the position detecting portion 134. This function enables it to assign the different behavior to an operation performed in a different area. Further, the drag operation of crossing over the area can be assigned to the predetermined behavior. It can be configured to switch the behavior executed through the drag operation, depending on the operation before or after the drag operation of crossing over the area. It is needless to say that these operation methods can be combined.

As the result, during the continuous drag operation, a user can specify a desired object, change the select state of the specified object, and execute the behavior depending on the select state. Namely, a user can perform an additional operation such as a mode switching operation and a displaying operation of auxiliary information, without taking off the operating body 10 from the touch panel 102. Further, predetermined behavior can be correspondingly assigned to each combination of: whether the area is crossed over or not, the direction of crossing over the area, and what operation is performed before and after the operation of crossing over the area. Therefore, it can achieve a variety of operations while keeping the intuitional convenient operation system. Further, an increase of GUI to be displayed on the display screen 14 can be restrained, which enables it to use the display screen 14 more widely.

[1-2: Display Control Method by Information Processing Apparatus 100]

Next, a display control method by the information processing apparatus 100 will be briefly summarized while confirming the operations and the flow of the processing, with reference to FIGS. 5, 6, 8, and 9.

(Scroll Operation)

At first, the operation and the flow of the processing during the scroll operation will be described with reference to FIGS. 5 and 6.

As illustrated in FIG. 5, when a user performs the scroll operation, he or she touches the touch panel 102 by the operating body 10 and drags it in his or her desired scrolling direction. The display controlling portion 112 scrolls the display contents depending on a change of the touch position. At this point, the display controlling portion 112 switches the select state of the folder object 16 depending on the touch position of the moving operating body 10. Further, the display controlling portion 112 switches the display contents of the display screen 14 into the photo object 18 corresponding to the selected folder object 16.

When switching into the high speed scroll mode, a user touches the mode switch button 20 before performing the scroll operation. However, when the mode switch button 20 is displayed on the display screen 14, as illustrated in FIG. 5, the display screen 14 gets narrower for the display of the mode switch button 20. Further, in the method of FIG. 5, a user has to once take off the operating body 10 from the touch panel 102 in order to switch into the high speed scroll mode and then touch the mode switch button 20, which is inconvenient. In this embodiment, the operation of crossing over the area is assigned to the mode switching operation as illustrated in FIG. 6 and the mode can be switched during the continuous drag operation.

At first, a user touches some area of the display screen 14. By performing the drag operation in this state, a user can perform the usual scroll operation as illustrated in FIG. 5. On the other hand, in this state, by dragging the operating body 10 from the display screen 14 to the outer frame 12, a user can switch into the high speed scroll mode. At this time, the information processing apparatus 100 detects the operation of crossing over the area through the operation judging portion 106 and performs the processing of switching the mode into the high speed scroll mode based on the detected result.

The switching processing to the high speed scroll mode is realized through the setting change of the scroll amount by the display controlling portion 112. After changing into the high speed scroll mode, a user continuously performs the drag operation on the area of the outer frame 12, to scroll the display contents at high speed. Thus, a user does not have to take off the operating body 10 from the touch panel 102 in the switching operation to the high speed scroll mode. Further, the mode switch button 20 does not have to be displayed on the display screen 14, thereby making it possible to use the display screen 14 widely. Accordingly, by using the function of the information processing apparatus 100 effectively, a convenient operation system can be realized.

(Display Operation of Auxiliary Information)

Next, the flow of the processing in performing the display operation of the auxiliary information will be described with reference to FIGS. 8 and 9.

As the operation for displaying the auxiliary information, for example, there can be considered a method of touching an object whose auxiliary information a user wants to display, for a predetermined time and a method of using a button for displaying the auxiliary information. In the method of touching it for a predetermined time, it is difficult to display the auxiliary information continuously while changing the object targeted for the auxiliary information with the scroll operation. On the other hand, when a button for displaying the auxiliary information is provided in the display screen 14, the effective display area of the display screen 14 becomes narrower. According to the embodiment, as illustrated in FIG. 8, the auxiliary information is configured to appear when a user drags the operating body 10 from the display screen 14 to the outer frame 12.

In order to display the auxiliary information, a user turns a desired object into a selected state on the display screen 14, as illustrated in FIG. 8, and then drags the operating body 10 from the display screen 14 to the outer frame 12. Then, the auxiliary information display object 22 appears near the object in a selected state. At this time, the information processing apparatus 100 detects the drag operation of crossing over the area through the operation judging portion 106 and displays the auxiliary information display object 22 through the display controlling portion 112, according to the detected result. When a user drags the operating body 10 positioned in the outer frame 12, the object in a selected state changes according to the shift of the operating body 10, as illustrated in FIG. 9.

According to a change of the object in a selected state, the display position and the display contents of the auxiliary information display object 22 are updated. At this time, the information processing apparatus 100 detects the drag operation on the frame area performed continuously from the above operation through the operation judging portion 106 and shifts the display position of the auxiliary information display object 22 through the display controlling portion 112 according to the detected result. Further, the display controlling portion 112 changes the display contents displayed in the display portion 132 according to the display position of the auxiliary information display object 22. For example, the image data displayed in the display screen 14 is updated according to the change of the folder object 16 in a selected state.

As mentioned above, a user does not have to take off the operating body 10 from the touch panel 102 in the display operation of the auxiliary information display object 22. Further, a user can view a plurality of auxiliary information continuously while moving the operating body 10 and updating the display contents of the auxiliary information display object 22. Further, since the GUI for displaying the auxiliary information display object 22 does not have to be displayed on the display screen 14, the display screen 14 can be used widely. By effectively using the function of the information processing apparatus 100, a more convenient operation system is realized.

As mentioned above, the display control method according to the first embodiment of the present invention has been described. By using the above method, an intuitional convenient operation system is realized. The embodiment has been described, for the sake of convenience, taking the concrete example, with reference to FIGS. 5 to 11. The technical scope of the embodiment, however, is not restricted to the display control method illustrated in FIGS. 5 to 11. Further, although the example about the display control of the image data has been used in the description, it is noted that the technique of the embodiment can be applied also to the display control of various digital data such as music data and text data.

2: Second Embodiment (Configuration about Music Data)

Next, a second embodiment of the present invention will be described. The embodiment relates to a technique of realizing a more convenient operation system using the sensor area expanded to the outer frame of the display panel, similarly to the first embodiment. In this embodiment, a method of displaying concrete music data auxiliary information and a display control method for displaying the information are proposed.

[2-1: Functional Configuration of Information Processing Apparatus 200]

At first, a functional configuration of an information processing apparatus 200 according to the second embodiment of the present invention will be described with reference to FIG. 12. FIG. 2 is an explanatory diagram showing an example of the functional configuration of the information processing apparatus 200 according to the embodiment. The same reference numerals are attached to the same structural elements having the substantially same function as the information processing apparatus 100 according to the first embodiment, hence to omit the detailed description.

As illustrated in FIG. 2, the information processing apparatus 200 includes a touch panel 102, an area judging portion 104, an operation judging portion 106, a music data reproducing portion 208, a music data storing portion 210, a display controlling portion 212, and a sound outputting portion 214. The music data reproducing portion 208 is one example of the content reproducing portion.

At first when a user performs an operation, the touch position of the operating body 10 is detected by the position detecting portion 134. The touch position information indicating the touch position detected by the position detecting portion 134 is input to the area judging portion 104 and the operation judging portion 106. Upon receipt of the touch position information, the area judging portion 104 judges whether the touch position is included in the frame area or the screen area, according to the touch position information. The result judged by the area judging portion 104 is input to the operation judging portion 106 as the area information.

As mentioned above, the area judging portion 104 receives the touch position information and the area information. Upon receipt of the information, the operation judging portion 106 judges whether the user's operation is the tap operation or the drag operation, according to the touch position information. Further, the operation judging portion 106 judges whether the user's operation is the operation of crossing over the area or not, according to the area information. The operation judging portion 106 judges a type of the operation, according to the information about the type of the user's operation within the corresponding area, whether or not it is the operation of crossing over the area, and the direction of crossing over the area. The information indicating the type of the operation judged by the operation judging portion 106 (hereinafter, referred to as operation information) is input to the display controlling portion 212.

When the type of the operation is an operation for reproducing music data, the operation judging portion 106 inputs the information for specifying the music data to be reproduced (hereinafter, referred to as reproduction music data information) into the music data reproducing portion 208. Upon receipt of the reproduction music data information, the music data reproducing portion 208 reads out the music data specified according to the reproduction music data information from the music data storing portion 210 and inputs the sound signals corresponding to the read music data into the sound outputting portion 214. At this point, the music data reproducing portion 208 creates the sound signals by performing predetermined decoding processing and descrambling processing on the music data depending on necessity. Upon receipt of the sound signals from the music data reproducing portion 208, the sound outputting portion 214 outputs the input sound signals.

Upon receipt of the operation information from the operation judging portion 106, the display controlling portion 212 updates the display contents displayed on the display portion 132, according to the operation information. When the operation information includes the information indicating the operation of switching to the high speed scroll mode, the display controlling portion 212 changes the setting of the scroll amount and scrolls the display contents with the changed scroll amount. As the scroll amount, for example, the scroll amount in the usual scroll mode is defined as one portion and the scroll amount in the high speed scroll mode is defined as three portions. In the high speed scroll mode, for example, the scroll amount may be set in every album or in every sort of music titles (for example, head letter).

When the operation information is the information indicating the display operation of the auxiliary information, the display controlling portion 212 displays predetermined auxiliary information on the display portion 132, as illustrated in FIG. 14. The auxiliary information includes, for example, title of music data, artist name, date of creation, reproducing time, reproducing history, and the like. For example, as illustrated in FIG. 14, when the outer frame 12 is tapped at a position corresponding to some music information display area 32, the display controlling portion 212 displays an auxiliary information display area 36 in a window. The display controlling portion 212 displays the auxiliary information in the auxiliary information display area 36.

When the operation information is the information indicating the operation of reproducing music data, the display controlling portion 212 displays GUI used for a reproduction control of the music data, for example, as illustrated in FIG. 13, in a full screen. As the GUI used for the reproduction control of the music data, there are, for example, a reproduction screen area 34 and an operation button 36. The reproduction screen area 34 is to display, for example, a video indicating an image of the music data and a photo of album jacket. The operation button 36 is provided to control playback, stop, fast forwarding, and fast rewinding of the music data.

Accordingly, a user can select music data from a music list and reproduce the selected music data, through the slide operation of the operating body 10. Further, a user can switch the mode into the high speed scroll mode and display the auxiliary information by performing the drag operation of crossing over the area. When this operation is assigned to a function of partially reproducing the music data, a user can search for desired music data while confirming the atmosphere of the music data as if seeing a preview of the image data. As mentioned above, by effectively using the function of the information processing apparatus 200, a more convenient operation system is realized.

[2-2: Display Control Method by Information Processing Apparatus 200]

A display control method by the information processing apparatus 200 will be briefly summarized while confirming the operation and the flow of the processing, with reference to FIGS. 13 and 14.

As illustrated in FIG. 13, when music data is reproduced, a user selects his or her desired music data from a music data list, with reference to the music data or album titles displayed in the music information display area 32. For example, a user taps the corresponding thumbnail 24 indicating the album photo of the music displayed on the display screen 14. When this tap operation is assigned to the reproduction behavior of music data, the display controlling portion 212 displays the GUI for the reproduction control as illustrated in FIG. 13. For example, the display controlling portion 212 displays the GUI including the reproduction screen area 34 and the operation button 36 in a full screen.

When a user operates the operation button 36, the information processing apparatus 200 reproduces the music data through the music data reproducing portion 208. The sound of the reproduced music data is output from the sound outputting portion 214. Further, the information processing apparatus 200 displays the image indicating the image of the music on the reproduction screen area 34 through the display controlling portion 212. Thus, the tap operation on the display screen 14 can be assigned to the reproduction behavior of music data. On the other hand, when the tap operation on the outer frame 12 is assigned to the display behavior of the auxiliary information, it becomes as illustrated in FIG. 14. When a user taps the outer frame 12, the information processing apparatus 200 displays the auxiliary information display area 38 through the display controlling portion 212, as illustrated in FIG. 14. At this time, the music data reproducing portion 208 does not reproduce the music data.

As mentioned above, the operation performed on the frame area and the operation performed on the screen area can be distinguished, which enables it to assign the different behavior to the same tap operation. As the result, it becomes easy to add an additional function such as an auxiliary information display function and a preview reproducing function while keeping the intuitional operability. Further, it can reduce the number of the times of taking off the operating body 10 from the touch panel 102, thereby holding the body stably. Further, it can operate at the higher speed for the less operation process. As the additional function, other than the above, for example, a display function of help information about the operation of GUI and a zoom function of the display contents may be considered.

As set forth hereinabove, the display control method according to the second embodiment of the present invention has been described. By using the above method, an intuitional and convenient operation system can be realized. The embodiment has been described taking the concrete example, for convenience' sake, with reference to FIGS. 13 and 14. The technical range of the embodiment, however, is not restricted to the method illustrated in FIGS. 13 and 14.

3: Hardware Configuration of Information Processing Apparatus 100,200

The function of each structural element of the above-described information processing apparatus 100, 200 can be realized, for example, by using the hardware configuration shown in FIG. 15. For example, the function of each structural element is realized by controlling the information processing apparatus as shown in FIG. 15 by using a computer program. The mode of the information processing apparatus shown is arbitrary, and may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 15, the information processing apparatus is configured mainly from a CPU 902, a ROM 904, a RAM 906, a host bus 908, a bridge 910, an external bus 912, an interface 914, an input portion 916, an output portion 918, a storage portion 920, a drive 922, a connection port 924, and a communication portion 926. Moreover, the CPU is an abbreviation for Central Processing Portion. Also, the ROM is an abbreviation for Read Only Memory. Furthermore, the RAM is an abbreviation for Random Access Memory.

The CPU 902 functions as an arithmetic processing portion or a control portion, for example, and controls an entire operation of the structural elements or some of the structural elements on the basis of various programs recorded on the ROM 904, the RAM 906, the storage portion 920, or a removal recording medium 928. The ROM 904 is means for storing, for example, a program loaded on the CPU 902 or data or the like used in an arithmetic operation. The RAM 906 temporarily or perpetually stores, for example, a program loaded on the CPU 902 or various parameters or the like arbitrarily changed in execution of the program.

These structural elements are connected to each other by, for example, the host bus 908 which can perform high-speed data transmission. On the other hand, the host bus 908 is connected to the external bus 912 whose data transmission speed is relatively low through the bridge 910, for example. Furthermore, the input portion 916 is, for example, a mouse, a keyboard, a touch panel, a button, a switch, or a lever. Also, the input portion 916 may be a remote control that can transmit a control signal by using an infrared ray or other radio waves.

The output portion 918 is, for example, a display device such as a CRT, an LCD, a PDP or an ELD, an audio output device such as a speaker or headphones, a printer, a mobile phone, or a facsimile that can visually or auditorily notify a user of acquired information. Moreover, the CRT is an abbreviation for Cathode Ray Tube. Furthermore, the PDP is an abbreviation for Plasma Display Panel.

The storage portion 920 is a device to store various data. The storage portion 920 is, for example, a magnetic storage device such as an HDD, a semiconductor storage device, an optical storage device, or a magneto-optical storage device. Moreover, the HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blue-ray medium, an HD-DVD medium, a memory stick, or an SD (Secure Digital) memory card. As a matter of course, the removal recording medium 928 may be, for example, an IC card on which a non-contact IC chip is mounted or an electronic device. Moreover, the IC is an abbreviation for Integrated Circuit.

The connection port 924 is a port such as an USB port, an IEEE1394 port, a SCSI, an RS-232C port, or a port for connecting an external connection device 930 such as an optical audio terminal. The external connection device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication portion 926 is a communication device to be connected to a network 932, and is, for example, a communication card for a wired or wireless LAN, Bluetooth (registered trademark), or WUSB, an optical communication router, an ADSL router, or various communication modems. The network 932 connected to the communication portion 926 is configured from a wire-connected or wirelessly connected network, and is, for example, the Internet, a home-use LAN, infrared communication, visible light communication, broadcasting, or satellite communication. Moreover, the LAN is an abbreviation for Local Area Network. Also, the WUSB is an abbreviation for Wireless USB. Furthermore, the ADSL is an abbreviation for Asymmetric Digital Subscriber Line.

4: Summary

At last, the functional configuration of the information processing apparatus according to the embodiments and the functions and effects obtained by the functional configuration will be summarized briefly.

At first, the functional configuration of the information processing apparatus according to the above embodiments can be expressed as follows. The information processing apparatus has the following outer frame portion, position detecting portion, and display controlling portion. The outer frame portion is to form an outer frame of a display portion for displaying an object. The position detecting portion is to detect the position of an operating body coming in touch with or close to the display portion or the outer frame portion. Further, when the operating body shifts to the outer frame portion while keeping in touch with or close to the display portion, the display controlling portion is to display on the display portion the auxiliary information about an object which is at the position of the operating body detected by the position detecting portion at a start of the shift.

Accordingly, when the operating body shifts from the display portion to the outer frame portion, the information processing apparatus is configured to detect the shift of crossing over the area and its moving direction and display the auxiliary information, thereby enabling a user to see the auxiliary information just through the drag operation of the operating body. As the result, a user does not have to take off the operating body from the display portion or the outer frame portion in order to display the auxiliary information, thereby enabling a high speed operation. Further, it is not necessary to provide with a separate GUI in order to display the auxiliary information, which enables it to use the display area widely.

When the operating body which has moved from the display portion to the outer frame portion shifts again with it kept in touch with or close to the outer frame portion, the display controlling portion may be configured to display the auxiliary information about an object displayed at a position corresponding to the position of the shifted operating body detected by the position detecting portion. According to this configuration, a user can continuously select an object targeted for displaying the auxiliary information through the tap operation and the like continuously from the display operation of the auxiliary information.

Further, the information processing apparatus may be provided with an object selecting portion which turns an object displayed on the display portion into a first select state, according to the position of the operating body detected by the position detecting portion, when the object is directly touched or approached by the operating body. In this case, when the operating body shifts to the display portion with it kept in touch with or close to the outer frame portion, the object selecting portion turns an object which is at the position of the shifted operating body detected by the position detecting portion, into a second select state different from the first select state.

As mentioned above, after and before the operation of crossing the area, different select states are assigned to the same object, so that a variety of states can be set to each object. Namely, a complicated operation system can be realized by using the combination of the operation of crossing the area and the operation in each area.

The information processing apparatus may be provided with a content reproducing portion which reproduces a content corresponding to the object when the object selecting portion turns an object into the first select state. In this case, when the object selecting portion turns an object into the second select state, the content reproducing portion displays the auxiliary information of the content corresponding to the object on the display. Accordingly, by relating a plurality of different select states to the same object, difference behavior in every select state can be assigned to the same object.

For example, when the content is a music content, the content reproducing portion may be configured to display one or whole of the information indicating the reproducing history of the music content, the reproducing time of the music, and the frequency of the reproduction on the display portion as the auxiliary information of the content. When the content is a moving image content, the content reproducing portion may be configured to display one or whole of the information indicating the reproducing history of the moving image content, the reproducing time of the moving image, and the frequency of the reproduction on the display portion as the auxiliary information of the content. Further, when the content is a static image content and the object means a folder corresponding to one or a plurality of static image contents, the content reproducing portion may be configured to display the thumbnail image of the static image content/contents corresponding to the object set in the second select state on the display portion as the auxiliary information of the content.

Instead of the display controlling portion, the information processing apparatus may be provided with a display controlling portion which scrolls the display contents of the display portion at a first speed according to the shift of an operating body when the area judging portion judges that the operating body is in the display area and scrolls the display content of the display portion at a second speed different from the first speed according to a shift of the operating body when it is judged to be in the outer frame area. As mentioned above, by changing the scroll speed according to the operation area, it is not necessary to display the mode switch button to a high speed scroll mode, thereby using the display area widely. Further, it is not necessary to operate the mode switch button, thereby reducing the operation process and enabling a high speed operation.

As mentioned above, using the technique according to the above embodiments, an intuitional convenient operation system can be realized.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-038234 filed in the Japan Patent Office on 20 Feb. 2009, the entire content of which is hereby incorporated by reference.

What is claimed is:

1. An information processing apparatus, comprising:
a display screen configured to display image data; and
circuitry configured to
  detect a drag gesture in which a continuous contact by an operating body originates in an area of the display screen above a selected object of the displayed image data and ends in an outer frame around a perimeter of the display screen, and
  control the display screen to display auxiliary information of content corresponding to the selected object of the image data displayed on the display screen in response to the drag gesture.

2. The information processing apparatus according to claim 1, wherein when the operating body moves in the drag gesture, the auxiliary information of the content corresponding to the selected object of the image data is displayed at a corresponding position of the operating body detected after the drag gesture.

3. The information processing apparatus according to claim 1, wherein the circuitry is further configured to:
turn the selected object of the image data displayed on the display screen into a first select state when the selected object of the image data is directly touched or approached by the operating body, according to a detected position of the operating body,
wherein when the operating body moves in the drag gesture, the circuitry is further configured to turn the selected object of the image data situated at a corresponding position of the operating body detected after the drag gesture into a second select state different from the first select state.

4. The information processing apparatus according to claim 3, wherein the circuitry is further configured to:
reproduce the content corresponding to the selected object of the image data when the selected object of the image data is turned into the first select state by being directly touched or approached by the operating body,
wherein when the selected object of the image data is turned into the second select state by the operating body moving in the drag gesture, the circuitry is further configured to display the auxiliary information.

5. The information processing apparatus according to claim 4, wherein when the content is music content, the circuitry is further configured to display information indicating one or more of a reproducing history of the music content, a reproducing time of the music content, and a frequency of reproduction of the music content, on the display screen, as the auxiliary information of the content.

6. The information processing apparatus according to claim 4, wherein when the content is moving image content, the circuitry is further configured to display information indicating one or more of a reproducing history of the moving image content, a reproducing time of the moving image content, and a frequency of reproduction of the moving image content, on the display screen, as the auxiliary information of the content.

7. The information processing apparatus according to claim 4, wherein when the content is static image content and the selected object of the image data is a folder corresponding to one or more static image contents, the circuitry is further configured to display a thumbnail image of each static image content of the one or more static image contents corresponding to the selected object of the image data set in the second select state, on the display screen, as the auxiliary information of the content.

8. The information processing apparatus according to claim 1, wherein the auxiliary information of the content corresponding to the selected object of the image data is displayed on the full display screen.

9. The information processing apparatus according to claim 1, wherein the auxiliary information of the content corresponding to the selected object of the image data is displayed in a window on the full display screen.

10. An information processing apparatus, comprising:
an outer frame positioned around a perimeter of a display screen, wherein image data is displayed on the display screen;
a position detecting portion which detects a position of an operating body coming into touch contact with the display screen and then with the outer frame; and
a display controlling portion configured to display auxiliary information of content corresponding to a selected object of the image data displayed on the display screen according to a drag gesture, wherein the drag gesture is a continuous contact by the operating body which originates in an area of the display screen above the selected object of the displayed image data and ends in the outer frame,
wherein the position detecting portion, the area judging portion, and the display controlling portion are each implemented via at least one processor.

11. An information processing method, implemented via at least one processor, the method comprising:
displaying image data on a display screen;
detecting a drag gesture in which a continuous contact by an operating body originates in an area of the display screen above a selected object of the displayed image data and ends in an outer frame around a perimeter of the display screen; and
displaying auxiliary information on the display screen of content corresponding to the selected object of the image data displayed on the display screen in response to the drag gesture.

12. An information processing method, implemented via at least one processor, comprising:
displaying image data on a display screen;
detecting a drag gesture in which a continuous contact by an operating body originates in an area of the display screen above a selected object of the displayed image data and ends in an outer frame around a perimeter of the display screen; and displaying auxiliary information on the display screen of content corresponding to the selected object of the image data displayed on the display screen in response to the drag gesture.

13. A non-transitory computer readable storage medium having embodied thereon a program, which when executed by a computer, causes the computer to execute a method, the method comprising:

displaying image data on a display screen;

detecting a drag gesture in which a continuous contact by an operating body originates in an area of the display screen above a selected object of the displayed image data and ends in an outer frame around a perimeter of the display screen; and displaying auxiliary information on the display screen of content corresponding to the selected object of the image data displayed on the display screen in response to the drag gesture.

14. A non-transitory computer readable storage medium having embodied thereon a program, which when executed by a computer, causes the computer to execute a method, the method comprising:

displaying image data on a display screen;

detecting a drag gesture in which a continuous contact by an operating body originates in an area of the display screen above a selected object of the displayed image data and ends in an outer frame around a perimeter of the display screen; and displaying auxiliary information on the display screen of content corresponding to the selected object of the image data displayed on the display screen in response to the drag gesture.

* * * * *